US008867396B2

(12) United States Patent
Viorel et al.

(10) Patent No.: US 8,867,396 B2
(45) Date of Patent: Oct. 21, 2014

(54) METHOD AND SYSTEM FOR LAST GASP DEVICE IDENTIFICATION

(75) Inventors: Dorin Viorel, Calgary (CA); Akira Ito, San Jose, CA (US)

(73) Assignee: Fujitsu Limtied, Kawasaki-shi (JP)

( * ) Notice: Subject to any disclaimer, the term of this patent is extended or adjusted under 35 U.S.C. 154(b) by 63 days.

(21) Appl. No.: 13/601,653

(22) Filed: Aug. 31, 2012

(65) Prior Publication Data

US 2014/0064110 A1     Mar. 6, 2014

(51) Int. Cl.
*H04L 12/26*     (2006.01)

(52) U.S. Cl.
USPC .................................................. 370/252

(58) Field of Classification Search
CPC ........ H04W 24/00; H04L 12/24; H04L 12/26
USPC .................................................. 370/252
See application file for complete search history.

(56) References Cited

U.S. PATENT DOCUMENTS

| | | | | |
|---|---|---|---|---|
| 7,826,382 | B2 * | 11/2010 | Sicurello et al. | 370/242 |
| 7,853,417 | B2 * | 12/2010 | Vaswani et al. | 702/60 |
| 8,391,177 | B2 * | 3/2013 | Picard | 370/252 |
| 8,488,482 | B2 * | 7/2013 | Clave et al. | 370/252 |
| 8,509,107 | B2 * | 8/2013 | Sicurello et al. | 370/252 |
| 2008/0177678 | A1 | 7/2008 | Martini et al. | 705/412 |
| 2008/0183339 | A1 * | 7/2008 | Vaswani et al. | 700/297 |
| 2009/0278708 | A1 | 11/2009 | Kelley et al. | |
| 2009/0296584 | A1 | 12/2009 | Bernard et al. | 370/241 |
| 2011/0026425 | A1 * | 2/2011 | Picard | 370/252 |
| 2012/0046891 | A1 * | 2/2012 | Yaney et al. | 702/62 |
| 2012/0126790 | A1 * | 5/2012 | Sobotka et al. | 324/119 |
| 2012/0126994 | A1 * | 5/2012 | Sobotka et al. | 340/870.02 |
| 2012/0146799 | A1 | 6/2012 | Bell et al. | |
| 2013/0136072 | A1 | 5/2013 | Bachmann et al. | 370/329 |
| 2013/0227689 | A1 | 8/2013 | Pietrowicz et al. | 726/23 |

FOREIGN PATENT DOCUMENTS

WO    WO 2012/064775     5/2012     ............ H04W 28/02

OTHER PUBLICATIONS

3GPP; "3rd Generation Partership Project; Technical Specification Group Radio Access Network; Study on RAN Improvements for Machine-type Communications; (Release 11)"; 3GPP Standard; vol. RAN WG2, No. V11.0.0; pp. 28, Sep. 26, 2011.
CMCC; "Identification of MTC Devices"; 3GPP Draft; R2-104551 Identification of MTC Devices; vol. RAN WG2; XP050451725; 3 Pgs, Aug. 16, 2010.
International Search Report and Written Opinion; PCT/US2013/044877; pp. 11, Sep. 17, 2013.
International Search Report and Written Opinion; PCT/US2013/044881; pp. 16, Nov. 13, 2013.

(Continued)

*Primary Examiner* — Jay P Patel
(74) *Attorney, Agent, or Firm* — Baker Botts L.L.P.

(57) ABSTRACT

A method for device identification includes determining a mass event has occurred in a wireless network from a reception of a plurality of signals each having a last gasp message, sampling a plurality of mapped zones associated with a base station, identifying which mapped zones are associated with a disconnected endpoint in a zone list, determining a length of time of the mass event, and selectively providing the zone list to identify disconnected endpoints based at least upon the length of time of the mass event. Each mapped zone includes a plurality of wireless device endpoints associated with the mapped zone. The sampling includes determining whether any of a subset of the endpoints associated with the given mapped zone are disconnected from the wireless network.

18 Claims, 9 Drawing Sheets

(56) References Cited

OTHER PUBLICATIONS

3Gpp TSG GERAN; "Graceful RACH Overload Relief"; Telefon AB LM Ericsson, 3GPP TSG GERAN # 46; pp. 13, 2010.
Huawei; "Considerations on RAN overload control"; 3Gpp TSG-RAN WG2 Meeting # 70; pp. 7, 2010.
Alcatel-lucent Shanghai Bell; "Discussion on RACH design for MTC"; 3GPP TSG RAM WG2 # 69; pp. 2, 2010.
Qualcomm; "RAn Overload control of delay tolerant devices in UMTS"; 3GPP TSG RAN WG2 # 74; pp. 11, 2011.
IEEE; "WirelessMAN—Advanced Air Interface for Broadband Wireless Access Systems"; IEEE P802.16p-11/0033; LAN/MAN Standards Committee ; pp. 62, 2011.
Electric Power Research Institute; "Report to NIST on the Smart Grid Interoperability Standards Roadmap"; Jun. 2009; pp. 291, Jun. 2009.
National Institute of Standards and Technology; "Guidelines for Smart Grid Cyber Security: vol. 3 Supportive Analysis and References"; pp. 219, Aug. 2010.
Ontario Smart Grid Forum; "Support Presentation for Agenda Items 1-4 & 7"; pp. 52, Jan. 2011.
National Institute of Standards and Technology; "NIST Priority Action Plan 2. Guidelines for Assessing Wireless Standards for Smart Grid Applications"; Feb. 2011; pp. 109, Feb. 2011.
3 GPP, R2-103742: "RACH Overload Solutions", ZTE, Jul. 2010; pp. 8, Jul. 2010.
3 GPP, R2-104617: "RACH Overload Analysis for MTC in LTE", ALU, Aug. 2010; pp. 7, Aug. 2010.
Pruessner; "When the Power Fails: Design for a Smart Meter's Last Gasp"; EETimes; pp. 3, Jun. 2012.
3GPP TS36.211 v10.4.0 (Dec. 2011); "Evolved Universal Terrestrial Radio Access (E-UTRA). Physical Channels and Modulation"; pp. 109, Jun. 2012.
U.S. Appl. No. 13/601,692; pp. 41, Aug. 31, 2009.
Non-Final Office Action; U.S. Appl. No. 13/601,692; 25 pages, Jun. 2, 2014.

* cited by examiner

US 8,867,396 B2

METHOD AND SYSTEM FOR LAST GASP DEVICE IDENTIFICATION

TECHNICAL FIELD

The present invention generally relates to network device support and, more particularly, to a method and system for last gasp device identification.

BACKGROUND

Wireless communications systems are used in a variety of telecommunications systems, television, radio and other media systems, data communication networks, and other systems to convey information between remote points using wireless transmitters and wireless receivers. A transmitter is an electronic device that, usually with the aid of an antenna, propagates an electromagnetic signal modulated with information such as radio, television, or other signals. A receiver is an electronic device that receives a wireless electromagnetic signal and processes the information modulated thereon. A transmitter and receiver may be combined into a single device called a transceiver.

Machine to machine (M2M) communications in large industrial networks may require the connection of over 30,000 machine User Equipment (UE) devices per cell. Long-Term Evolution (LTE) and/or Long-Term Evolution-Advanced (LTE-A) networks may be used for fourth-generation (4G) wireless technology communication used to provide communication between and/or among all UEs and a base station, e.g., Evolved Node B (eNB).

SUMMARY

In accordance with one or more embodiments of the present disclosure, a method for device identification includes determining a mass event has occurred in a wireless network from a reception of a plurality of signals each having a last gasp message, sampling a plurality of mapped zones associated with a base station, identifying which mapped zones are associated with a disconnected endpoint in a zone list, determining a length of time of the mass event, and selectively providing the zone list to identify disconnected endpoints based at least upon the length of time of the mass event. Each mapped zone includes a plurality of wireless device endpoints associated with the mapped zone. The sampling includes determining whether any of a subset of the endpoints associated with the given mapped zone are disconnected from the wireless network.

In accordance with another embodiment of the present disclosure, one or more non-transitory computer-readable media embodying logic is provided that, when executed by a processor, is configured to perform operations including determining a mass event has occurred in a wireless network from a reception of a plurality of signals each having a last gasp message, sampling a plurality of mapped zones associated with a base station, identifying which mapped zones are associated with a disconnected endpoint in a zone list, determining a length of time of the mass event, and selectively providing the zone list to identify disconnected endpoints based at least upon the length of time of the mass event. Each mapped zone includes a plurality of wireless device endpoints associated with the mapped zone. The sampling includes determining whether any of a subset of the endpoints associated with the given mapped zone are disconnected from the wireless network.

In accordance with another embodiment of the present disclosure, a base station for wireless communication is provided comprising a memory and a processor coupled to a memory. The processor configured to determine a mass event has occurred in a wireless network from a reception of a plurality of signals each having a last gasp message, sample a plurality of mapped zones associated with a base station, identify which mapped zones are associated with a disconnected endpoint in a zone list, determine a length of time of the mass event, and select the zone list to identify disconnected endpoints based at least upon the length of time of the mass event. Each mapped zone includes a plurality of wireless device endpoints associated with the mapped zone. The sampling includes determining whether any of a subset of the endpoints associated with the given mapped zone are disconnected from the wireless network.

The object and advantages of the invention will be realized and attained by means of at least the features, elements, and combinations particularly pointed out in the claims. It is to be understood that both the foregoing general description and the following detailed description are exemplary and explanatory and are not restrictive of the invention, as claimed.

DETAILED DESCRIPTION

Embodiments of the present invention and its advantages are best understood by referring to FIGS. 1-11 of the drawings, like numerals being used for like and corresponding parts of the various drawings.

Figure 1:
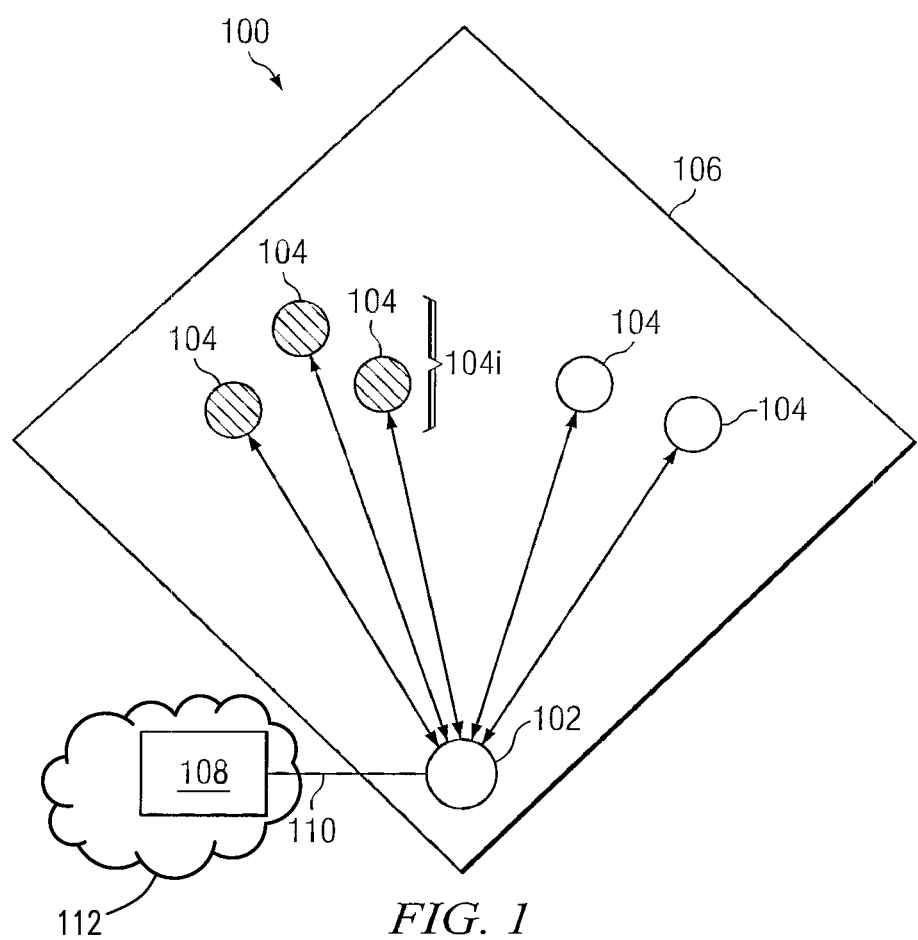
FIG. 1 illustrates a section of an example machine-to-machine (M2M) wireless network, in accordance with one embodiment of the present disclosure.

FIG. 1 illustrates an example machine-to-machine (M2M) wireless network 100, in accordance with one embodiment of the present disclosure. Network 100 may include one or more base stations 102 that communicate with one or more endpoints 104 via wireless communication methods. Network 100 may provide wireless coverage for any suitable number of endpoints 104 over a geographic area such as cell 106. For example, base station 102 may be used to provide wireless coverage for an entire building, a city block, a campus, or any other area. Cell 106 may have any suitable shape, such as a diamond shape depicted in FIG. 1.

As used herein, base station 102 may refer to a transmission site, a remote transmission site, a Radio Element Control, an Evolved Node B (eNB), a Baseband Unit, a Radio Element, and/or a Remote Radio Head (RRH). Base station 102 may include any combination of hardware, software embedded in a computer readable medium, and/or encoded logic incorporated in hardware or otherwise stored (e.g., firmware) to implement any number of communication protocols that allow for wired or wireless exchange of information in network 100. Base station 102 may be operable to send control signals and data traffic to endpoints 104. Base station 102 may use any suitable technologies or protocols, e.g., Common Public Radio Interface (CPRI), to communicate with other base stations 102.

Base station 102 may also be coupled to any network or combination of networks capable of transmitting signals, data, and/or messages, including signals, data, or messages transmitted through WebPages, e-mail, text, chat, voice over IP (VoIP), and instant messaging in order to provide services and data to endpoints 104. For example, base station 102 may be coupled to one or more local area networks (LANs), wide area networks (WANs), metropolitan area networks (MANs), public switched telephone networks (PSTNs), worldwide interoperability for microwave access (WiMAX) networks, global distributed networks such as the Internet, or any other form of wireless or wired networking. As an example, base station 102 may be coupled to a core infrastructure network 112, which may include server 108, via a LAN 110.

Base station 102 may communicate with endpoints 104 using wireless communication via one or more ports (not expressly shown). Base station 102 may communicate with endpoints 104 using any suitable wireless technology, including, but not limited to, Long-Term Evolution (LTE) or Long-Term Evolution-Advanced (LTE-A) protocols. In some embodiments, base station 102 may coordinate with other base stations 102 to communicate jointly with endpoint 104.

Endpoint 104 may be any type of wireless device able to send and receive data and/or signals to and from other endpoints 104, base station 102 directly, and/or base station 102 via one or more other base stations 102. Some examples of endpoints 104 include desktop computers, PDAs, cell phones, laptops, VoIP phones, wireless measurement devices, wireless sensors, and/or Machine User Equipment (UE). Endpoints 104 may provide data or network services to a human and/or machine user through any suitable combination of hardware, software embedded in a computer readable medium, real-time processing system, and/or encoded logic incorporated in hardware or otherwise stored (e.g., firmware). Endpoints 104 may also include unattended or automated systems, gateways, other intermediate components or other devices that may send or receive data and/or signals. Various types of information may be sent to or from endpoints 104. As an example, endpoint 104 may send identification data and status data to base station 102.

Network 100 may have been initially designated for human use. However, M2M communications, also known as Machine Type Communications (MTC), may have emerged as market driven class of applications. M2M traffic patterns may be significantly different from human mobile traffic. During M2M mass event scenarios, (e.g., after a power outage scenario impacting most or all endpoints 104 connected to base station 102, the related network 100 may be overloaded when the mass event resolves, e.g., power is returned. Additionally, network 100 may be unable to identify particular endpoints 104 that are involved in the mass event. In order to allow network 100 to properly process mass triggered machine events, last gasp function may be employed for some endpoints 104 as the capability of endpoints 104 to emit one last message when it loses power.

Further, network 100 and base station 102 may be required to accommodate large numbers of endpoints 104 in the form of machine UE devices, e.g., up to more than approximately 30,000 devices per cell 106. For example, sensor networks in industrial applications, smart grid/meters in residential utility applications, and/or smart home networks may include large numbers of endpoints 104. Network 100 may include only machine UE devices in the case of a M2M network, or network 100 may be a mix of human UE devices and machine UE devices in a human/machine network. During power outages or other mass event scenarios, endpoints 104$i$ may be impacted and may lose power. Endpoints 104$i$ may generate transmission of a last message, e.g., "last gasp" message (LGM). The LGM may be sent immediately after a power loss or other mass scale event. The LGM may be transmitted within a last gasp (LG) interval of approximately 50 ms to 500 ms immediately after the power outage or other mass scale event occurs. The LGM may include information indicating that the power outage or other mass scale event has occurred, e.g., that endpoint 104$i$ has experienced a power loss or other mass scale event.

The LGM transmitted by endpoint 104 may be sent using a Random Access Channel (RACH) and/or a Physical Random Access Channel (PRACH). A PRACH may be a shared channel used for initial communication between endpoint 104 and base station 102 and for communication of unscheduled messages such as when endpoint 104 exits sleep mode, loses power, or executes a handover. Thus, for example, a PRACH may be used to transmit a LGM from endpoint 104 to base station 102 across and/or utilizing an LTE or LTE-A network. If endpoint 104 is unable to transmit a LGM following a power outage or other mass scale event, base station 102 may be unaware that a particular endpoint 104 is no longer connected to the network and possibly not operating. Additionally, when recovering from mass event scenarios involving large numbers of endpoints 104, the access channel including a RACH or PRACH may be overloaded (e.g., when power returns due to a large number of LGM endpoints 104, which in turn will be attempting to contact base station 102 simultaneously). If the PRACH becomes overloaded when power is restored to endpoints 104, then signals sent from endpoints 104 attempting to reconnect to base station 102 may collide and some or most endpoints 104 may be unable to connect to network 100.

In some embodiments, predefined endpoints 104 may communicate and transmit signals to a primary endpoint 104, also called a "PRACH group candidate." The communication between predefined endpoints 104 and the PRACH group candidate may occur using a different wireless technology and/or network than the technology and/or network designed to communicate between endpoints 104 and base station 102. The PRACH group candidate may utilize the PRACH to communicate information regarding all predefined endpoints 104 to base station 102. While this "group access" may reduce traffic across the PRACH between endpoints 104 and base station 102, endpoints 104 may have a higher cost because they may be required to support multiple communication technologies, e.g., support for communication with the PRACH group candidate and communication with base station 102.

Figure 2:
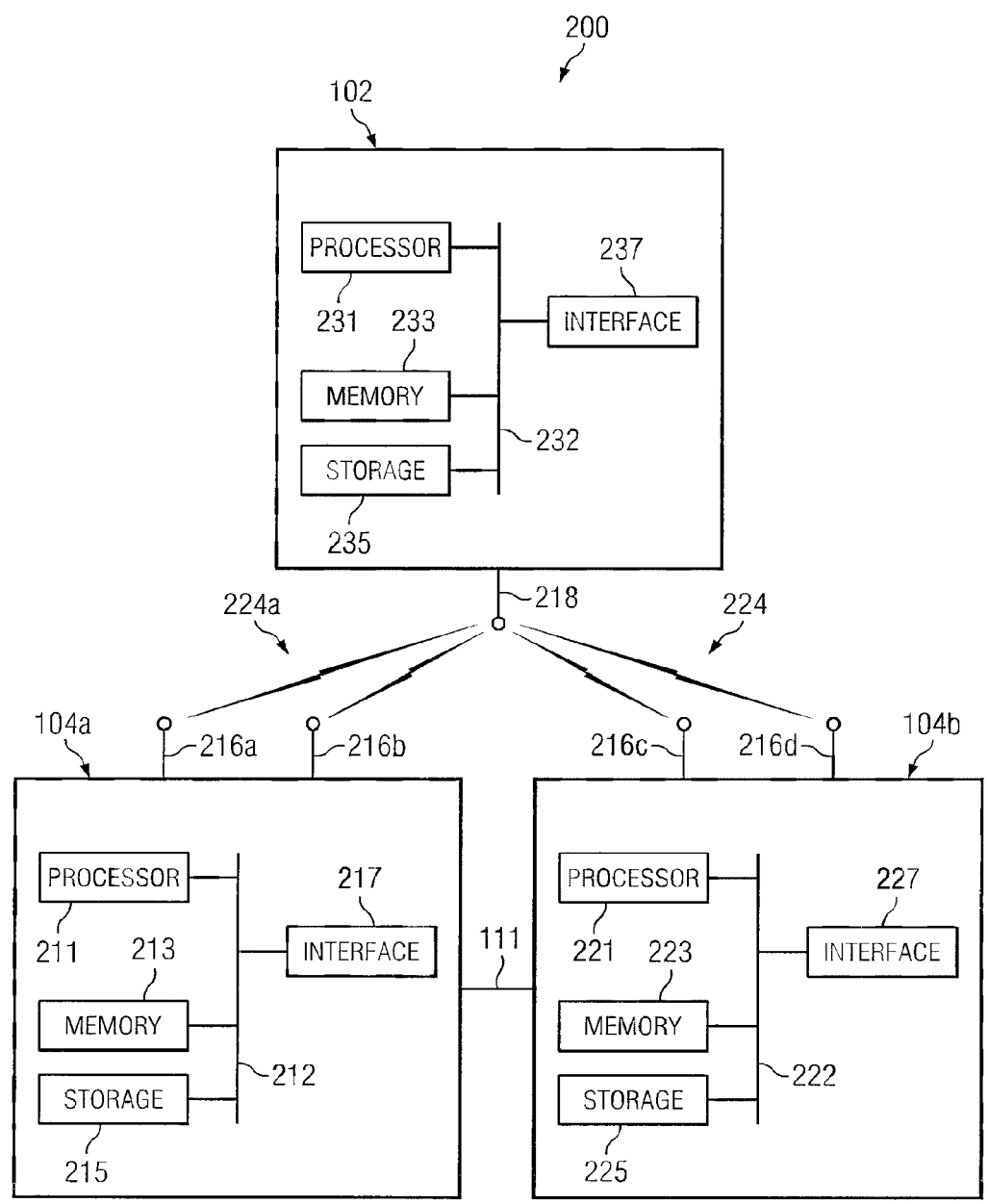
FIG. 2 illustrates example apparatuses that may facilitate the operations of various components of FIG. 1, in accordance with one embodiment of the present disclosure.

FIG. 2 illustrates example apparatuses that may facilitate the operations of various components of FIG. 1, in accordance with one embodiment of the present disclosure. FIG. 2 includes an example antenna system 200 with two example endpoints 104 and example base station 102. Antenna system 200 may correspond to at least a portion of network 100 of FIG. 1. Endpoints 104 and base station 102 may each include one or more portions of one or more computer systems.

System 200 may allow for multiple-input/multiple output (MIMO) transmission where multiple antennas are used for transmitting and receiving wireless signals. Additionally, system 200 may be configured to perform Coordinated Multipoint Processing (CoMP) to coordinate and combine the transmission of signals used in MIMO transmission. The CoMP processing may perform down link (DL) CoMP transmission in which multiple base units 102 jointly communicate with endpoints 104 and/or multiple endpoints 104 communicate with base unit 102.

Endpoints 104 may communicate with base station 102 using wireless communication via one or more antenna ports 216. For example, endpoint 104a may communicate with base station 102 via antenna ports 216a and 216b. Endpoint 104b may communicate with base station 102 via antenna ports 216c and 216d. Endpoints 104 may communicate with base station 102 using any of a variety of different wireless technologies, including, but not limited to, orthogonal frequency division multiple access (OFDMA), LTE, and LTE-A protocol as defined in the Generation Partnership Project (3GPP) Release 11 or beyond. In some embodiments of the present disclosure, endpoint 104a may coordinate with one or more other endpoints 104 to communicate jointly with base station 102. In such embodiments, endpoints 104 may coordinate with each other to communicate with base station 102 using a MIMO transmission scheme where multiple transmitting antenna ports 216 are placed at different endpoints 104, while one or more receiving antenna port 218 are located at the base station 102.

For example, endpoints 104 may communicate with base station 102 using a DL CoMP MIMO transmission as defined in 3GPP Release 11 or beyond. During such a MIMO transmission, endpoint 104 may wirelessly communicate a portion of a data stream to base station 102 via one or more wireless connections between antenna ports 216 and one or more antenna port 218 of base station 102.

The components of endpoints 104 and base station 102 may comprise any suitable physical form, configuration, number, type and/or layout. As an example, and not by way of limitation, endpoint 104 and/or base station 102 may comprise an embedded real-time processing system, computer system, a system-on-chip (SOC), a single-board computer system (SBC) (for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, endpoint 104 and/or base station 102 may include one or more computer systems; be unitary or distributed; span multiple locations; span multiple machines; or reside in a cloud, which may include one or more cloud components in one or more networks.

In the depicted embodiment, endpoints 104a and 104b and base station 102 each include their own respective processor 211, 221, and 231; memory 213, 223, and 233; storage 215, 225, and 235; interface 217, 227, and 237; and bus 212, 222, and 232. Although a particular antenna system is depicted having a particular number of particular components in a particular arrangement, this disclosure contemplates any suitable antenna system 200 having any suitable number of any suitable components in any suitable arrangement. For simplicity, similar components of endpoints 104 and base station 102 will be discussed together. However, it is not necessary for these devices to have the same components, or the same type of components. For example, processor 211 may be processor 231 may be an application specific integrated circuit (ASIC).

Processor 211, 221 and 231 may be a microprocessor, controller, or any other suitable computing device, resource, or combination of hardware, software and/or encoded logic operable to provide, either alone or in conjunction with other components (e.g., memory 213, 223, and 233, respectively), wireless networking functionality. Such functionality may include providing various wireless features discussed herein. For example, processor 231 may be configured to analyze data and/or signals communicated between base station 102 and endpoints 104 via channels 224. Further, processor 211 and 221 of endpoints 104 may be configured to analyze signals and/or data communicated from base station 102 via channels 224.

In some embodiments, processor 211, 221, and 231 may include hardware for executing instructions, such as those making up a computer program. As an example, and not by way of limitation, to execute instructions, processor 211, 221, and 231 may retrieve (or fetch) instructions from an internal register, an internal cache, memory 213, 223, or 233, respectively, or storage 215, 225 or 235, respectively; decode and execute them; and then write one or more results to an internal register, an internal cache, memory 213, 223, or 233, respectively, or storage 215, 225, or 235, respectively.

In some embodiments, processor 211, 221, and 231 may include one or more internal caches for data, instructions, or addresses. This disclosure contemplates processor 211, 221, and 231 including any suitable number of any suitable internal caches, where appropriate. As an example, and not by way of limitation, processor 211, 221, and 231 may include one or more instruction caches, one or more data caches, and one or more translation lookaside buffers (TLBs). Instructions in the instruction caches may be copies of instructions in memory 213, 223, or 233, respectively, or storage 215, 225, or 235, respectively, and the instruction caches may speed up retrieval of those instructions by processor 211, 221, or 231, respectively. Data in the data caches may be copies of data in memory 213, 223, or 233, respectively, or storage 215, 225, or 235, respectively, for instructions executing at processor 211, 221, or 231, respectively, to operate on; the results of previous instructions executed at processor 211, 221, or 231 for access by subsequent instructions executing at processor 211, 221, or 231, or for writing to memory 213, 223, or 233, respectively, or storage 215, 225, or 235, respectively; or other suitable data. The data caches may speed up read or write operations by processor 211, 221, or 231. The TLBs may speed up virtual-address translations for processor 211, 221, or 231. In some embodiments, processor 211, 221, and 231 may include one or more internal registers for data, instructions, or addresses. Depending on the embodiment, processor 211, 221, and 231 may include any suitable number of any suitable internal registers, where appropriate. Where appropriate, processor 211, 221, and 231 may include one or more arithmetic logic units (ALUs); be a multi-core processor; include one or more processors 211; or any other suitable processor.

Memory 213, 223, or 233 may be any form of volatile or non-volatile memory including, without limitation, magnetic media, optical media, random access memory (RAM), read-only memory (ROM), flash memory, removable media, or any other suitable local or remote memory component or components. In some embodiments, memory 213, 223, or 233 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 213, 223, or 233 may include one or more memories 213, 223, or 233, respectively, where appropriate. Memory 213, 223, or 233 may store any suitable data or information utilized by endpoints 104 or base station 102, respectively, including software embedded in a computer readable medium, and/or encoded logic incorporated in hardware or otherwise stored (e.g., firmware). In some embodiments, memory 213, 223, or 233 may include main memory for storing instructions for processor 211, 221, or 231, respectively, to execute or data for processor 211, 221, or 231 to operate on. In some embodiments, one or more memory management units (MMUs) may reside between processor 211, 221, or 231 and memory 213, 223, or 233, respectively, and facilitate accesses to memory 213, 223, or 233 requested by processor 211, 221, or 231, respectively.

As an example, and not by way of limitation, endpoints 104 or base station 102 may load instructions from storage 215, 225, or 235, respectively, or another source (such as, for example, another computer system, another base station, or a remote transmission site) to memory 213, 223, or 233, respectively. Processor 211, 221, or 231 may then load the instructions from memory 213, 223, or 233, respectively, to an internal register or internal cache. To execute the instructions, processor 211, 221, or 231 may retrieve the instructions from the internal register or internal cache and decode them. During or after execution of the instructions, processor 211, 221, or 231 may write one or more results (which may be intermediate or final results) to the internal register or internal cache. Processor 211, 221, or 231 may then write one or more of those results to memory 213, 223, or 233, respectively. In some embodiments, processor 211, 221, or 231 may execute only instructions in one or more internal registers or internal caches or in memory 213, 223, or 233, respectively (as opposed to storage 215, 225, or 235, respectively, or elsewhere), and may operate only on data in one or more internal registers or internal caches or in memory 213, 223, or 233, respectively (as opposed to storage 215, 225, or 235, respectively, or elsewhere).

In some embodiments, storage 215, 225, or 235 may include mass storage for data or instructions. As an example, and not by way of limitation, storage 215, 225, or 235 may include a hard disk drive (HDD), a floppy disk drive, flash memory, an optical disc, a magneto-optical disc, magnetic tape, or a Universal Serial Bus (USB) drive or a combination of two or more of these. Storage 215, 225, or 235 may include removable or non-removable (or fixed) media, where appropriate. Storage 215, 225, or 235 may be internal or external to transmission site 108, where appropriate. In some embodiments, storage 215, 225, or 235 may be non-volatile, solid-state memory. In some embodiments, storage 215, 225, or 235 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 215, 225, or 235 may take any suitable physical form and may comprise any suitable number or type of storage. Storage 215, 225, or 235 may include one or more storage control units facilitating communication between processor 211, 221, or 231, respectively, and storage 215, 225, or 235, respectively, where appropriate.

In some embodiments, interface 217, 227, or 237 may include hardware, encoded software, or both providing one or more interfaces for communication (such as, for example, packet-based communication) between endpoints 104, base station 102, any networks, any network devices, and/or any other computer systems. As an example, and not by way of limitation, communication interface 217, 227, or 237 may include a network interface controller (NIC) or network adapter for communicating with an Ethernet or other wire-based network and/or a wireless NIC (WNIC) or wireless adapter for communicating with a wireless network.

In some embodiments, interface 217 or 227 comprise one or more radios coupled to one or more antenna ports 216. In such an embodiment, interface 217 or 227 receives digital data that is to be sent out to wireless devices, such as base station 102, via a wireless connection. The radio may convert the digital data into a radio signal having the appropriate center frequency, bandwidth parameters, and transmission power. Similarly, the radios may convert radio signals received via one or more receiving antennas into digital data to be processed by, for example, processor 211 or 221, respectively. Interface 237 of base station 102 may be configured to perform similar operations via processor 231 and antenna port 218.

Depending on the embodiment, interface 217, 227, or 237 may be any type of interface suitable for any type of network for which antenna system 200 is used. As an example, and not by way of limitation, antenna system 200 may communicate with an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, antenna system 200 may communicate with a wireless PAN (WPAN) (such as, for example, a BLUETOOTH WPAN), a WI-FI network, a WI-MAX network, an LTE network, an LTE-A network, a cellular telephone network (for example, a Global System for Mobile Communications (GSM) network), or any other suitable wireless network or a combination of two or more of these. Endpoints 104a and 104b, and base station 102 may include any suitable interface 217, 227, or 237, respectively, for any one or more of these networks, where appropriate.

In some embodiments, interface 217, 227, or 237 may include one or more interfaces for one or more I/O devices. One or more of these I/O devices may enable communication between a person and endpoints 104 and/or base station 102. As an example, and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Some embodiments may include any suitable type and/or number of I/O devices and any suitable type and/or number of interface 217, 227, or 237 for them. Where appropriate, interface 217, 227, or 237 may include one or more drivers enabling processor 211, 221, or 231, respectively, to drive one or more of these I/O devices.

Interface 217, 227, or 237 may include one or more interface 217, 227, or 237, respectively, where appropriate.

Bus 212, 222, or 232 may include any suitable combination of hardware, software embedded in a computer readable medium, and/or encoded logic incorporated in hardware or otherwise stored (e.g., firmware) to couple components of endpoint 104 and base station 102 to each other. As an example, and not by way of limitation, bus 212, 222, or 232 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 212, 222, or 232 may include any number, type, and/or configuration of bus 212, 222, or 232, where appropriate. In some embodiments, one or more buses 212, 222, or 232 (which may each include an address bus and a data bus) may couple processor 211, 221, or 231, respectively, to memory 213, 223, or 233, respectively. Bus 212, 222, or 232 may include one or more memory buses, and may be specialized and dedicated multi-threaded busses.

Herein, reference to a computer-readable storage medium encompasses one or more tangible computer-readable storage media possessing structures. As an example, and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Some embodiments may include one or more computer-readable storage media implementing any suitable storage. In some embodiments, a computer-readable storage medium implements one or more portions of processor 211, 221, or 231 (such as, for example, one or more internal registers or caches), one or more portions of memory 213, 223, or 233, one or more portions of storage 215, 225, or 235, or a combination of these, where appropriate. In some embodiments, a computer-readable storage medium implements RAM or ROM. In some embodiments, a computer-readable storage medium implements volatile or persistent memory. In some embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In some embodiments, encoded software includes one or more application programming interfaces (APIs) stored or encoded in a computer-readable storage medium. Some embodiments may use any suitable encoded software written or otherwise expressed in any suitable programming language or combination of programming languages stored or encoded in any suitable type or number of computer-readable storage media.

In some embodiments, encoded software may be expressed as source code or object code. In some embodiments, encoded software is expressed in a higher-level programming language, such as, for example, C, Perl, or a suitable extension thereof. In some embodiments, encoded software is expressed in a lower-level programming language, such as assembly language (or machine code). In some embodiments, encoded software is expressed in JAVA. In some embodiments, encoded software is expressed in Hyper Text Markup Language (HTML), Extensible Markup Language (XML), real time OS (RTOS), or other suitable markup language.

Accordingly, the above mentioned components of endpoints 104 and base station 102 may enable endpoints 104 and base station 102 to perform operations such as joint DL transmission according to the present disclosure. Modifications, additions, or omissions may be made to FIG. 2 without departing from the scope of the present disclosure. For example, any of the options or features described herein may be utilized in combination with the illustrated embodiments of FIGS. 1 and 2 and/or any number of the other options or features also described herein as would be understood by one of ordinary skill in the art. As another example, base station 104 may include a real time physical (PHY) layer processor coupled to a fast access RAM and a permanent ROM memory. The real time PHY processor may be configured to process a plurality of signals stored into one or more subframes received from one or more endpoints 104.

In embodiments of the present disclosure, antenna system 200 may be a M2M sensor network (e.g., a smart grid). The M2M network may have the characteristics of being fixed or portable such that some endpoints 104 may have no mobility attributes. The M2M network may be AC powered and may exhibit infrequent and/or bursty communication and traffic patterns. As signals are sent across channels 224, the expected Time of Arrival (ToA) may be less than 5 seconds. As more endpoints 104 are added to an M2M network, a dedicated LTE or LTE-A network may be necessitated. When a mass scale event occurs, e.g., power outage, many endpoints 104*i* may be disconnected from system 200. As endpoint 104*i* loses AC power, endpoint 104*i* may send a LGM during the LG interval, between approximately 20 and 500 ms after power loss or other mass scale event. The LG interval may also be called "LGM duration" or indicated by $LGM_{Duration}$. The LG interval may average 200 ms.

As a consequence, base station 102 may employ a system and method triggered by the LGM to detect that endpoints 104*i* have experienced an event causing a LGM and then further identify the number, location, and/or type of endpoints 104*i* affected by the mass scale event in order to take any appropriate remedial steps. A power outage or other mass scale event with a longer duration may allow base station 102 to identify more accurately aspects of endpoint 104*i*. A short duration of a mass event such a power outage may limit base station 102 identification of all aspects of endpoint 104*i*. Remedial steps taken by base station 102 may include preparing for recovery, rerouting signals, and/or any other appropriate remedial measure. Thus, as discussed in detail below and in embodiments of the present disclosure, a load cognitive PRACH algorithm may be employed that includes LGM detection, LGM device identification, and M2M LGM PRACH access optimization upon recovery. Specifically, LGM detection will be described in more detail in association with FIGS. 4-7 and LGM device identification will be described in more detail in association with FIGS. 8-11.

In some embodiments, following detection of an LGM, the M2M network may further identify the LGM devices utilizing the LGM time and corresponding Time Advancing (TA)

zones that may be based on the locations of the LGM devices. The selection of TA zones may depend on the power outage or other mass event duration. When the LGM devices may be ready to reconnect to the network, the network may schedule and perform a contention-free random access targeting procedure. In this procedure, the LGM devices may attempt to access the network and may be unsuccessful. If the LGM device is unsuccessful, it may utilize a scheduled contention free opportunity.

Generally, M2M devices, e.g., endpoints 104, operating in a dedicated LTE M2M network may execute two types of access to an eNB, e.g., base station 102. A first type of access may be termed random access (RA) procedure including a random access channel (RACH) backed by a PRACH based access on the physical (PHY) layer. An RA procedure may be utilized when endpoint 104 connects to the base station 102. Transmissions may include, for example, scheduled transmissions of data, following the exit of isle or sleep mode, or powering on by a user, or after an accidental power failure. Thus, the RA procedure may target initial access, synchronization following idle/sleep mode, and/or handover (HO) procedures. Before the RA procedure begins, endpoints 104 may be in an initial status that may be either RRC_IDLE status, e.g., when endpoint 104 may be in sleep mode to conserve power, or NOT_CONNECTED status, e.g., when endpoint 104 may be powered down or removed from the network temporarily. Endpoints 104 subject to an RA procedure may migrate from either RRC_IDLE status or NOT_CONNECTED status to RRC_CONNECTED status, e.g., when endpoint 104 may be connected and/or transmitting information, from the LTE network perspective. The second type of access may be termed LGM PRACH access. When a LGM enabled device is subject to a power outage or other mass scale event, a LGM PRACH access procedure may be triggered. Devices starting a LGM PRACH access procedure may be in an RRC_IDLE state. In some embodiments, as endpoints 104 communicate with base station 102, 64 preamble signatures may be processed by base station 102 within one PRACH subframe.

Figure 3:
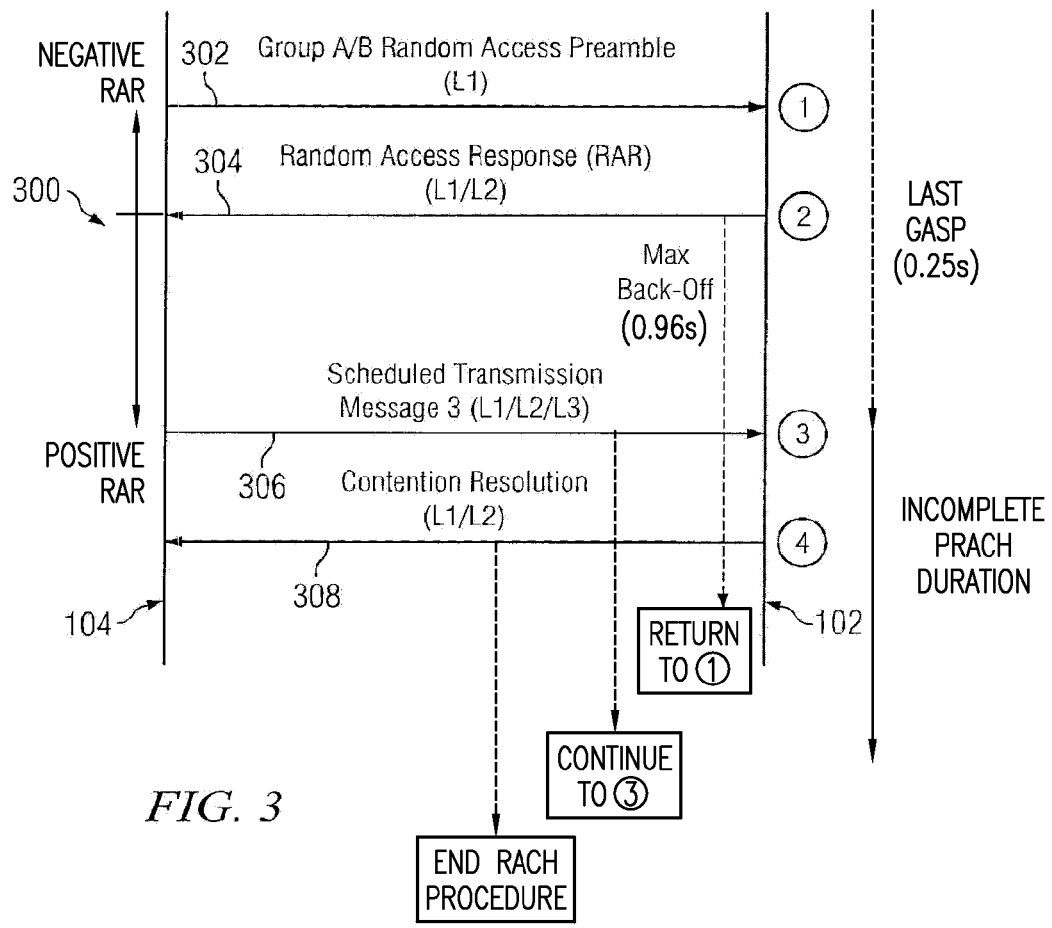
FIG. 3 illustrates an example random access (RA) procedure between an endpoint and a base station, in accordance with one embodiment of the present disclosure.

FIG. 3 illustrates an example RA procedure 300 between endpoint 104 and base station 102, in accordance with one embodiment of the present disclosure. RA procedure 300 may be employed when transitioning endpoint 104 from idle or RRC_IDLE status, and/or not connected or NOT_CONNECTED status, to connected or RRC_CONNECTED status. In digital communications, such as communication over a wireless network, e.g., network 100 of FIG. 1, a preamble may be a sequence of known bits included in each transmission to synchronize endpoint 104 in time and frequency with base station 102. Base station 102 may utilize preambles when receiving transmissions from endpoints 104. The access sequence may be known to the endpoint, which may select randomly one of the preamble signatures to transmit it to the base station, should the end-point need to migrate to an RRC-Connected state. Further, the preambles may include up to 64 signatures. In some embodiments, the 64 preamble signatures may be divided between Group A and Group B to differentiate at base station 102 between the types of Message 3 sent by endpoints 104, as discussed in detail below. RA procedure 300 may begin with transmission 302 that may include a Group A/B Random Access Preamble communicated from endpoint 104 to base station 102. Transmission 302 may also be called a Level 1 (L1) or PHY layer-based. Base station 102 may respond to endpoint 104 with response 304 that may include a Random Access Response (RAR). The RAR may include L1 and Level 2 (L2) signaling, e.g., an L1/L2 signal. If transmission 302 may not be properly decoded by base station 102 due to preamble signature collision, base station 102 may transmit a negative RAR, also possibly indicating a back-off indicator (BI) for endpoint 104. A negative RAR may indicate to endpoint 104 to wait and resend the signal 302 later. The BI may include a parameter indicating the time delay before endpoint 104 may send an additional PRACH transmission. The BI for RA procedure 300 may be set for a maximum length of approximately 0.96 seconds. Thus, after a preselected or scheduled passage of time, e.g., the BI time, endpoint 104 may re-attempt to transmit transmission 302. If transmission 302 may have been properly received and processed by base station 102, base station 102 may transmit a positive RAR (or acknowledgement) with response 304. Message 306 may be transmitted by endpoint 104 that may include a Scheduled Transmission Message that may also be called a "Message 3." Message 306 may be based on L1, L2, and Level 3 (L3) signaling, and may include sending to base station 102 the unique identification for endpoint 104. Base station 102 may conclude the RA procedure with resolution 308. Resolution 308 may include a Contention Resolution signal that may include L1/L2 signaling. Thus, RA procedure 300 may contain four messaging steps between endpoint 104 and base station 102.

While RA procedure 300 may include a complete four step procedure ending with a contention resolution signal (resolution 308), the LGM PRACH access procedure may not include all four steps due to the expected short duration of the LG interval average of 200 ms. For example, the LG interval may end before the RA procedure completes. Thus, endpoint 104 may not be able to connect to base station 102 or re-synchronize with base station 102. In some embodiments, endpoint 104 may not complete resolution 308 and/or may not be able to complete any steps beyond transmission 302. Thus, the LGM PRACH access procedure may include endpoints 104 that may not complete the full RA procedure.

Figure 4:
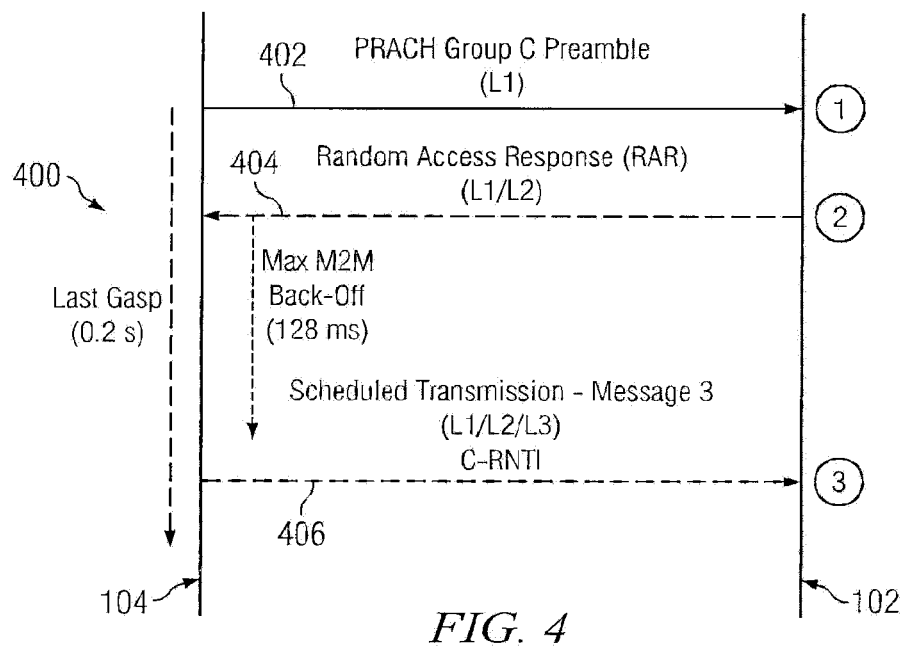
FIG. 4 illustrates an example last gasp message (LGM) physical random access channel (PRACH) procedure utilizing new Group C preambles, in accordance with one embodiment of the present disclosure.
Figure 5:
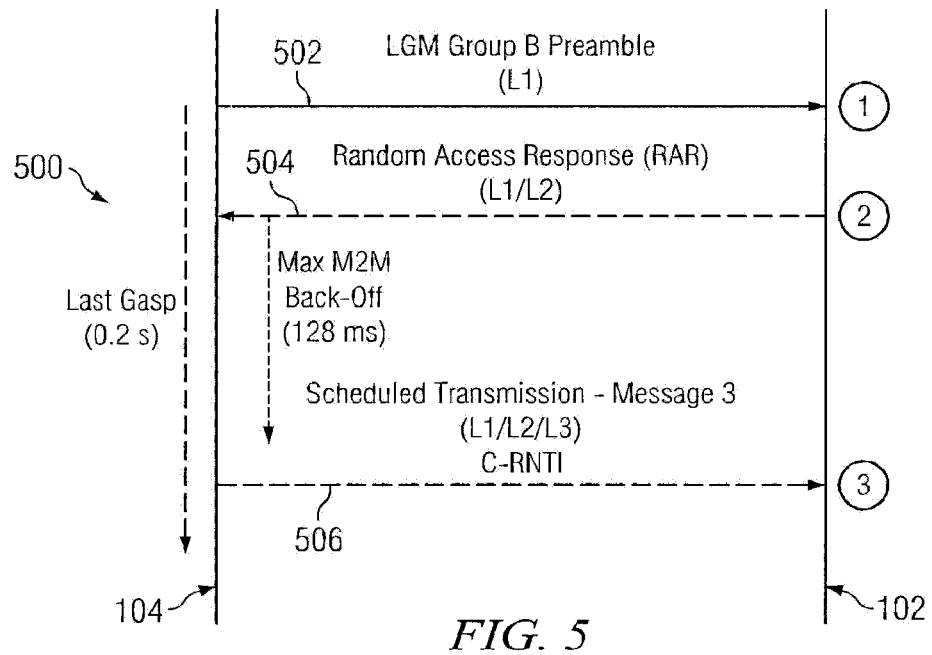
FIG. 5 illustrates an example LGM PRACH procedure utilizing existing Group B preambles, in accordance with one embodiment of the present disclosure.
Figure 6:
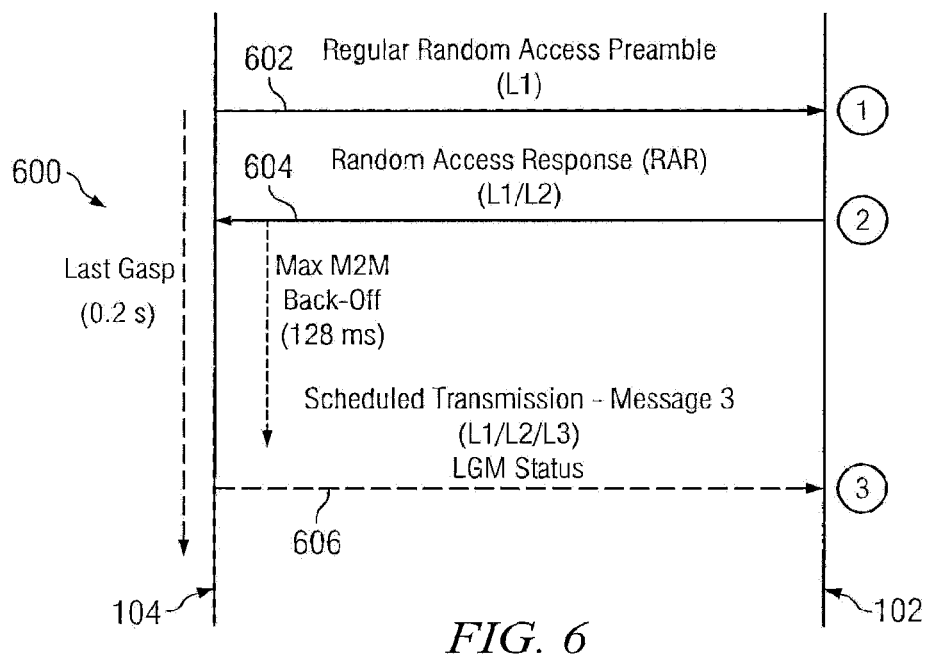
FIG. 6 illustrates an example LGM PRACH procedure modifying a second PRACH message from an endpoint, in accordance with one embodiment of the present disclosure.

Accordingly, FIGS. 4-6 illustrate example LGM PRACH access procedures that may enable detection of endpoints 104 that may have experienced a power loss or other mass scale event. Hence, FIG. 4 illustrates an example LGM PRACH procedure 400 utilizing new preamble Group C, in accordance with one embodiment of the present disclosure. LGM PRACH procedure 400 may occur immediately after a power loss or other mass scale event for all or a subset of endpoints 104 in network 100 shown in FIG. 1. In some embodiments, LGM PRACH procedure 400 may start with endpoint 104 to send a LGM as endpoint 104 powers down immediately following a power loss or other mass scale event. In LGM PRACH procedure 400, a new Group C of preamble signatures may be defined to support a LGM. In one embodiment, Group C signatures may be allocated from the same 64 signatures discussed with respect to Groups A and B in FIG. 3. Group C signatures may not affect the underlying PRACH PHY or L1 preamble signals from endpoint 104. LGM PRACH procedure 400 may be suited for M2M networks, mixed machine/human networks, and/or other suitable network configurations and protocols.

LGM PRACH procedure 400 may begin with transmission 402 that may include a PRACH Group C Preamble (L1 signal) communicated from endpoint 104 to base station 102 immediately after a power loss or other mass scale event experienced by endpoint 104. Group C signatures may originate from the overall pool of preamble signatures, which in one embodiment is 64 signatures. Group C signatures may include a minimum of two signatures leaving a maximum of 62 signatures for distribution between Groups A and B. However, the number of signatures in Groups A, B, and C may vary up to a combined total of 64 signatures.

Base station 102 may respond to endpoint 104 with response 404. Response 404 may include an RAR backed by L1/L2 signaling. Endpoint 104 may utilize a reduced BI in LGM PRACH procedure 400. In some embodiments, the reduced BI may be approximately 128 ms or less. The reduced BI may apply only to Group C preambles, which may be the LGM dedicated signatures. The reduced BI may be employed to accommodate the average LGM duration of 200 ms. This reduced BI may increase the chances a LGM device, e.g., endpoint 104, may access the PRACH for a second time using Group C of preambles. Additionally, the BI interval may allow base station 102 to increase the amount of dedicated Group C signatures. Following a positive RAR transmitted by bases station 102 to endpoint 104, endpoint 104 may respond back to base station 102 with message 406. Message 406 may also be called "Message 3." Message 406 may include a Scheduled Transmission Message. Message 406 may also include L1, L2, and L3 signaling. Message 406 may include the identification, e.g., a random network temporary identifier (C-RNTI), of endpoint 104. The C-RNTI information may allow base station 102 to recognize endpoint 104. In some embodiments, message 406 may include a LGM status.

While RA procedure 300 (shown in FIG. 3) may include four steps ending with resolution 308, LGM PRACH procedure 400 may not complete four steps due to the expected short duration of the LG interval average of 200 ms. In one embodiment, endpoint 104 may not complete contention resolution with resolution 308. Moreover, in heavy contention cases, endpoint 104 may not be identified by base station 102 following a successful reception of message 406 by base station 102.

Accordingly, in some embodiments, due to limited time constraints, a successful transmission of message 406 may not occur. If message 402 is received but not decoded and the amount of collisions computed over PRACH Group C exceeds a certain threshold, the network may conclude that a power outage or other mass scale event occurred and at least some of endpoints 104 may no longer be connected to the wireless network (e.g., network 100 of FIG. 1). In the illustrated embodiment, transmission 402 may have been detected and received by base station 102. The received information may be transmitted to a server, such as server 108 of FIG. 1, and/or other suitable device for subsequent processing and/or transmission 402 information may be processed locally at base station 102.

In some embodiments, in order to increase the chances one or more endpoints 104 may be detected and/or identified, the allocation of signatures to the PRACH Group C may be dynamically adjusted. Dynamic adjustment of PRACH Group C signatures may allow base station 102 to detect and/or identify as many possible endpoints 104. As noted above, the BI, e.g., the predefined time delay before endpoint 104 sends an additional PRACH transmission following receipt of a negative RAR, may be reduced to approximately 128 ms or less to allow up to two PRACH Group C preamble transmissions from endpoint 104 to base station 102 during the LG interval. Multiple PRACH Group C preamble transmissions based on multiple transmissions from multiple endpoints 104 may result in signal collisions at base station 102. Signal collisions may occur if a signal is transmitted from endpoint 104 but cannot be properly decoded because multiple endpoints 104 may have selected the same preamble signature at the same time. If base station 102 determines the PRACH Group C collision rate, defined as $P_{coll}$(Group C), is above a predefined allowable collision rate, defined as $\sigma_C$, base station 102 may conclude that a power outage or other mass scale event impacting one or more endpoints 104 from the coverage area, e.g., cell 106 shown in FIG. 1, may have occurred. As a result, base station 102 may attempt to increase the size of PRACH Group C preamble opportunities as quickly as possible to the allowed maximum size and/or within the maximum allowed time. In some embodiments, the time allowed for PRACH Group C expansion, defined as $T_{(GroupC)}$, may be a function of the LGM duration. For example, $T_{(GroupC)} < 0.75$ $LGM_{Duration}$.

Further, in some embodiments, a timer (T1) may be inserted following the PRACH Group C size being increased to the maximum. T1 may be employed before base station 102 may reduce Preamble Group C back to normal size and/or after the collision rate of Preamble Group C is below the predefined allowable collision rate. The duration of T1 may be established according to demands of a specific implementation and/or may be determined experimentally. In one embodiment, utilizing a timer may avoid multiple variations of collision rates due to possible inaccuracies in measuring the collision rate of Group C signals.

Base station 102 scheduler may revert to the original PRACH Group C size after:

(i) Base station 102 detects that the rate of PRACH Group C collisions is below a predefined allowable rate of collisions: $P_{coll}$(Group C) < $\sigma_C$; and/or (ii) Timer (T1) expires.

The rate of PRACH Group C collisions may be determined by the ratio of the number of PRACH Group C collisions and the PRACH Group C capacity:

$$P_{coll}(\text{Group } C) = \frac{PRACH(C) \text{ collision}}{PRACH(C) \text{ capacity}};$$

where:
PRACH(C) collision=number of collisions on preamble Group C; and
PRACH(C) capacity=capacity of PRACH Group C.

FIG. 5 illustrates an example LGM PRACH procedure 500 utilizing existing Group B preambles, in accordance with one embodiment of the present disclosure. Group B preamble signatures may include a subset of the 64 signatures discussed with respect to Groups A and B in FIG. 3. LGM PRACH procedure 500 may occur after a power loss or other mass scale event for all or a subset of endpoints 104 in network 100 shown in FIG. 1. In some embodiments, PRACH Group B of preambles may be redefined to support LGM only, without affecting the underlying PRACH PHY (L1) preamble signals. Similar to LGM PRACH procedure 400 (shown in FIG. 4), base station 102 may detect PRACH Group B collisions and may determine a power outage or other mass scale event has occurred. The illustrated embodiment may be utilized by M2M LTE access networks and/or other suitable network configurations and protocols.

LGM PRACH procedure 500 may begin with transmission 502 that may include a LGM Group B Preamble (L1 signal) communicated from endpoint 104 to base station 102 immediately after a power loss or other mass scale event experienced by endpoint 104. Group B signatures may originate from the overall pool of preamble signatures, which in one embodiment includes 64 signatures. Group B may include a minimum of two signatures of the overall signatures of the PRACH subframe, which may leave a maximum of 62 signatures for Group A. However, the number of signatures in Groups A and B may vary up to the combined total of 64 signatures.

Base station 102 may respond to endpoint 104 with response 504 that may include a RAR backed by L1/L2 signaling. Endpoint 104 may utilize a reduced BI in LGM PRACH procedure 500 of maximum approximately 128 ms. After a preselected or scheduled passage of time, e.g., the reduced BI, endpoint 104 may re-transmit message 502 to base station 102. Following receipt of a positive RAR from base station 102, endpoint 104 may proceed with message 506. Message 506 may also be called "Message 3." Message 506 may include a Scheduled Transmission Message. Further, message 506 may include L1, L2, and L3 signaling. Message 506 may also include endpoint 104 identification, e.g., C-RNTI. The C-RNTI may allow base station 102 to uniquely recognize endpoint 104 and may indicate within message 506 that endpoint 104 may be a LGM device. In some embodiments, message 506 may include a LGM status While RA procedure 300 (shown in FIG. 3) may include four steps ending with resolution 308, LGM PRACH procedure 500 may not complete all four steps due to the expected short duration of the LG interval average of 200 ms. In one embodiment, endpoint 104 may not complete contention resolution with resolution 308. In heavy contention cases, endpoint 104 may not be identified by base station 102 because endpoint 104 may not be able to transmit message 506.

Accordingly, in some embodiments, due to limited time constraints, a successful transmission of message 506 may not occur. If message 506 may not be transmitted and a high collision rate was detected on Preamble Group B (possibly as a result of the collision measurements executed on message 502) the network may conclude that a power outage or other mass scale event has occurred and at least some of endpoints 104 may no longer be connected to the wireless network (e.g., network 100 of FIG. 1), without being able to identify any of the LGM devices. In the illustrated embodiment, the transmission 502 may have been received but not properly detected by base station 102. The information (such as measured preamble Group B collision rate) may be transmitted to a server, such as server 108 of FIG. 1, and/or other suitable device for subsequent processing and/or transmission 502 information may be processed locally at base station 102.

Similar to LGM PRACH procedure 400 shown in FIG. 4, in order to increase the chances one or more endpoints 104 may be detected and/or identified, the allocation of signatures to the PRACH Group B may be dynamically adjusted. Thus, dynamic adjustment of PRACH Group B signatures may allow base station 102 to detect and/or identify as many possible endpoints 104 transmitting a LGM. As noted above, the BI, e.g., the predefined time delay before endpoint 104 sends an additional PRACH transmission if the first transmission 502 is not successful, may be reduced to maximum approximately 128 ms. The reduced BI may allow maximum two PRACH Group B preamble transmissions from endpoint 104 to base station 102 given the LGM duration. Multiple PRACH Group B preamble transmissions based on multiple transmissions from multiple endpoints 104 may cause signal collisions at base station 102 when received at base station 102 if the same preamble Group B signatures are selected. Signal collisions may occur if a signal is transmitted from multiple endpoints 104 and received at base station 102, but cannot be properly decoded. If base station 102 computes that PRACH Group B collision rate, defined as $P_{coll}$(Group B) is above a predefined allowable collision rate, defined as $\sigma_B$, base station 102 may conclude that a power outage or other mass scale event has occurred. As a result, base station 102 may attempt to increase PRACH preamble Group B as quickly as possible to the allowed maximum size and/or within the maximum allowed time. In some embodiments, the time allowed for PRACH Group B expansion, defined as $T_{(GroupB)}$, may be a function of the LGM duration. For example, $T_{(GroupB)} < 0.75\, \text{LGM}_{Duration}$.

Further, in some embodiments, a timer (T1) may be inserted following PRACH Group B size being increased to the maximum. T1 may be employed before base station 102 may reduce Preamble Group B back to normal size and/or after the collision rate of Preamble Group B is below the predefined allowable collision rate. The duration of T1 may be established according to demands of a specific implementation and/or may be determined experimentally. In one embodiment, utilizing a timer may avoid multiple instances of high variations of the measured collision rates due to possible inaccuracies in reading the collision rate of Group B signals.

Base station 102 scheduler may revert to the original PRACH size after:

(i) Base station 102 detects that the rate of PRACH Group B collisions is below a predefined allowable rate of collisions: $P_{coll}$(Group B)$<\sigma_B$; and/or (ii) Timer (T1) expires.

The rate of PRACH Group B collisions may be determined by the ratio of the number of PRACH Group B collisions and the PRACH Group B capacity:

$$P_{coll}(\text{Group } B) = \frac{PRACH(B) \text{ collision}}{PRACH(B) \text{ capacity}};$$

where

PRACH(B) collision=number of collisions occurring on received preamble Group B; and PRACH(B) capacity=capacity of PRACH Group B.

FIG. 6 illustrates an example LGM PRACH procedure 600 modifying a second PRACH message from endpoint 104, in accordance with one embodiment of the present disclosure. LGM PRACH procedure 600 may occur after a power loss or other mass scale event for all or a subset of endpoints 104 in network 100. In some embodiments, a second PRACH message sent from endpoint 104, also called "Message 3," may be modified to support a LGM if the mass scale event occurs when endpoint 104 is in RRC_IDLE status. Endpoint 104 may be able to orderly transition from RRC_IDLE status to NOT_CONNECTED status while transmitting a LGM. Further, LGM PRACH procedure 600 may be utilized in conjunction with procedure 400 and/or procedure 500 of FIGS. 4 and 5. In some embodiments, the second message sent from endpoint 104 may be transmitted within the LGM duration, e.g., approximately 200 ms.

LGM PRACH procedure 600 may begin with transmission 602 that may include a Regular Random Access Preamble (L1 signal) communicated from endpoint 104 to base station 102 during or immediately after a power loss or other mass scale event experienced by endpoint 104. Base station 102 may respond to endpoint 104 with response 604 that may include an RAR. Response 604 may include L1/L2 signaling. Endpoint 104 may utilize a reduced BI in LGM PRACH procedure 600 of maximum approximately 128 ms, following the reception of a negative RAR. Following a positive RAR, endpoint 104 may send message 606, also called "Message 3." Message 606 may include a Scheduled Transmission Message. Message 606 may include L1/L2/L3 signaling. In some embodiments, message 606 may include a LGM status signal. The LGM status signal may indicate that message 606 is from a LGM device.

While RA procedure 300 (shown in FIG. 3) may include four steps ending with resolution 308, LGM PRACH procedure 600 may not complete all four steps due to the expected short duration of the LG interval average of 200 ms. In one embodiment, endpoint 104 may not complete contention resolution step with resolution 308. In heavy contention cases, endpoint 104 may not be identified by base station 102 following a successful reception of message 606 by base station 102. Further, base station 102 may not be able to identify all endpoints 104 attempting to transmit message 606, and it may be sufficient to decode oat least one message 606 in order to trigger LGM Device Identification stages.

In some embodiments, LGM PRACH procedure 600 may allow base station 102 to detect a LGM sent by endpoint 104 utilizing an enhanced message 606. Message 606 may correspond to endpoint 104 that selected a Group A signature. In order to increase the chances that one or more endpoints 104 may be detected and/or identified, the allocation of the PRACH Group A signatures may be dynamically adjusted. Dynamic adjustment of PRACH Group A signatures may allow base station 102 to detect and/or identify as many possible endpoints 104 utilizing message 606. Further, PRACH Group A maximum subframe allocation may be established according to demands of a specific implementation and/or may be determined experimentally. In some embodiments, PRACH Group A maximum size increase may be determined by a base station scheduler policy. As noted above, the BI, e.g., the predefined time delay before endpoint 104 sends an additional PRACH L1 transmission, may be reduced to maximum approximately 128 ms to allow one endpoint 104 to access PRACH multiple times within the LGM duration. Notably, in some embodiments, LGM PRACH procedure 600 that identifies a modification of message 606 may not require any changes to L2 and/or L3 messages.

Base station 102 scheduler may revert to the original PRACH size after:

(i) Base station 102 detects that the rate of PRACH Group A collisions is below a predefined allowable rate of collisions: $P_{coll}(\text{Group A}) < \sigma_A$; and/or (ii) Timer (T1) expires.

The rate of PRACH Group A collisions may be determined by the ratio of the number of PRACH Group A collisions and the PRACH Group A capacity:

$$P_{coll}(\text{Group A}) = \frac{PRACH(A) \text{ collision}}{PRACH(A) \text{ capacity}};$$

where:

PRACH(A) collision=number of collisions related to Group A; and

PRACH(A) capacity=capacity of PRACH Group A.

Figure 7:
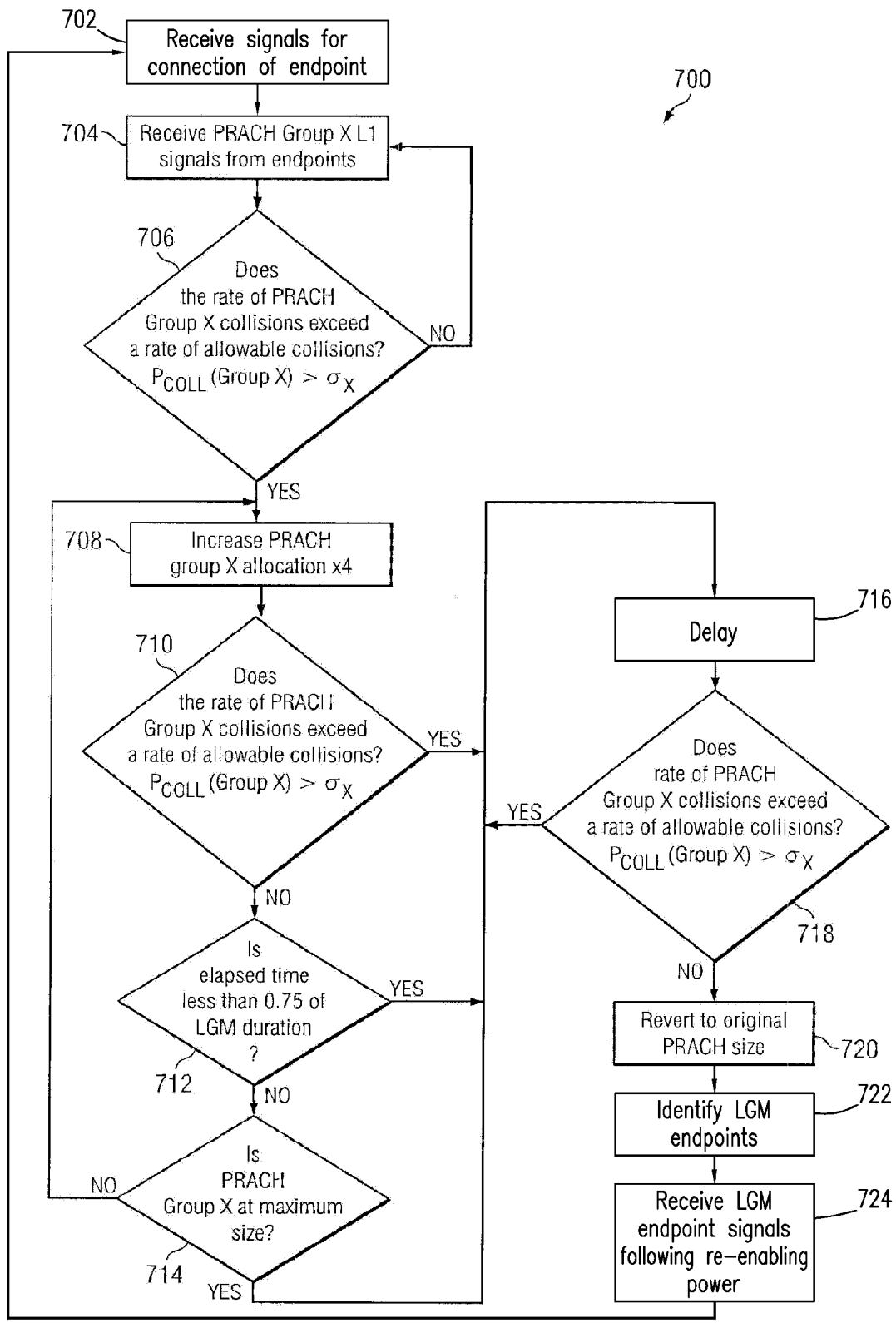
FIG. 7 illustrates a flow chart of an example method for last gasp device detection, in accordance with one embodiment of the present disclosure.

FIG. 7 illustrates a flow chart of an example method 700 for last gasp device detection, in accordance with one embodiment of the present disclosure. The steps of method 700 may be performed by various computer programs, models or any combination thereof, configured to simulate and design systems for last gasp detection. The programs and models may include instructions stored on computer-readable medium, and operable to perform, when executed, one or more of the steps described below. The computer-readable media may include any system, apparatus or device configured to store and retrieve programs or instructions such as a hard disk drive, a compact disc, flash memory or any other suitable device. The programs and models may be configured to direct a processor or other suitable unit to retrieve and execute the instructions from the computer-readable media. For illustrative purposes, method 700 is described with respect to network 100 of FIG. 1; however, method 700 may be used for last gasp detection on any suitable network.

Method 700 may start and at step 702, base station 102 may receive signals for connection of endpoints 104. Endpoints 104 may subsequently enter idle status or sleep status. At step 704, a base station may receive Group X L1 signals over a PRACH from endpoints. Group X may be Group A, B, or C depending on the implementation selected. For example, base station 102 may receive signals from endpoints 104. As discussed previously, a PRACH may be a shared channel used for initial communication between endpoint 104 and base station 102, for communication between multiple endpoints 104, and for communication of unscheduled messages such as when endpoint 104 goes into idle status or loses power. Thus, endpoints 104 may send LGMs to base station 102 by utilizing the PRACH. Further, Group X in step 704 and throughout method 700 may represent any group of preambles and/or signatures, for example, Group C of FIG. 4, Group B of FIG. 5, or Group A of FIG. 6.

At step 706, base station 102 may determine if the rate of PRACH Group X collisions, defined as $P_{coll}(\text{Group X})$, exceeds a predefined allowable rate of collisions, defined as $\sigma_X$. Thus, base station 102 may determine: $P_{coll}(\text{Group X}) > \sigma_X$. As discussed with respect to FIG. 4, base station 102 may determine if PRACH Group C collision rate is above a predefined threshold of allowable rate of collisions.

If the rate of PRACH Group X collisions exceeds the predefined allowable rate of collisions, then multiple LGMs may be transmitting and a power outage or other mass scale event may be indicated and method 700 may proceed to step 708. If the rate of PRACH Group X collisions does not exceed the predefined allowable rate of collisions, then a power outage or other mass scale event may not have occurred and method 700 may return to step 704.

At step 708, base station 102 may increase the PRACH Group X allocation by a predetermined factor, such as a factor of 4. If a power outage or other mass scale event has occurred and multiple LGMs are being transmitted to base station 102, then rapidly increasing the PRACH Group X size may provide more opportunities for endpoints 104 affected by a power outage or mass scale event to be successfully detected following a L1 PRACH transmission. For example, with respect to FIG. 4, the signatures allocated to Group C preambles may be increased.

At step 710, base station 102 may again determine if the rate of PRACH Group X collisions, defined as $P_{coll}(\text{Group X})$, exceeds a predefined allowable rate of collisions, defined as $\sigma_X$. Thus, base station 102 may again determine: $P_{coll}(\text{Group X}) > \sigma_X$. If the rate of PRACH Group X collisions still exceeds the predefined allowable rate of collisions, then multiple LGMs may be transmitting, a power outage or other mass scale event may still be indicated, and method 700 may proceed to step 716. If the rate of PRACH Group X collisions does not exceed the predefined allowable rate of collisions, then method 700 may return to step 712.

At step 712, base station 102 may determine if the elapsed time for PRACH Group X expansion has exceed 0.75 times (or other implementation dependent duration) the LGM Duration: $T_{(GroupX)} < 0.75 \text{ LGM}_{Duration}$. If the time for PRACH expansion has exceeded 0.75 $\text{LGM}_{Duration}$ then method 700 may proceed to step 716. If the time for PRACH expansion has not exceeded 0.75 $\text{LGM}_{Duration}$, then method 700 may proceed to step 714.

At step 714, base station 102 may determine if the PRACH Group X is at the maximum size. The maximum size for a PRACH may be preset and may be established according to demands of a specific implementation. If PRACH Group X is at the maximum allowed size, then method 700 may proceed to step 716. If PRACH Group X is not yet at the maximum allowed size, then method 700 may return to step 708.

At step 716, base station 102 may execute a delay. Such execution may include determining whether a previously user defined or default timer (T1) has expired. T1 may be set in order to avoid possible inaccuracies and/or variations on measuring the collision rate. In one embodiment, T1 may be started when PRACH size is first increased (step 708).

At step 718, base station 102 may again determine if the rate of PRACH Group X collisions, defined as $P_{coll}$(Group X), exceeds a predefined allowable rate of collisions, defined as $\sigma_X$. Thus, base station 102 may again determine: $P_{coll}$(Group X)>$\sigma_X$. If the rate of PRACH Group X collisions still exceeds the predefined allowable rate of collisions, then multiple LGMs may be transmitting over Preamble Group X, a power outage or other mass scale event may still be indicated, and method 700 may return to step 716. If the rate of PRACH Group X collisions does not exceed the predefined allowable rate of collisions CH, then method 700 may return to step 720.

At step 720, base station 102 may revert the PRACH back to the original size, such as the size before the mass event occurred. At step 722, base station 102 may identify endpoints 104 that may have transmitted an LGM. At step 724, base station may begin to receive signals from endpoints 104 that may have previously transmitted an LGM. These signals may be transmitted after power is restored to endpoints 104 and may require a scheduling method based upon how many endpoints 104 attempt to access network 100 at a particular time. Method 700 may then return to step 702.

Figure 8:
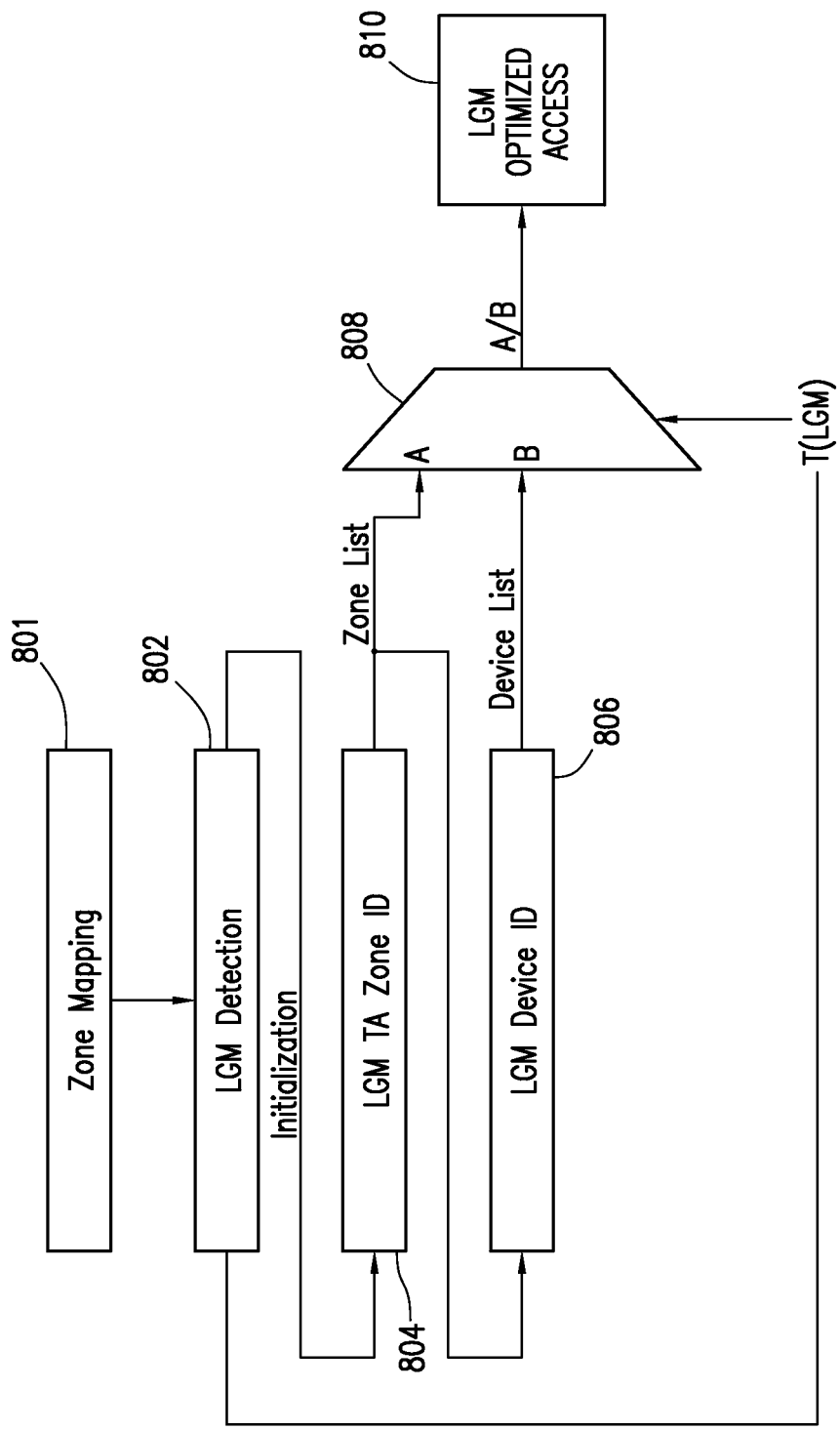
FIG. 8 illustrates the configuration and operation of a system to perform last gasp identification of one or more endpoints that have experienced a mass scale event affecting the availability of the endpoints, in accordance with one embodiment of the present invention.

FIG. 8 illustrates the configuration and operation of system 100 to perform last gasp identification of one or more endpoints 104$i$ that have experienced a mass scale event affecting availability of the endpoints 104$i$, in accordance with one embodiment of the present invention. Such a mass scale event may include, for example, a widespread power outage. Given the large number of endpoints 104$i$ that may have experienced the mass scale event, endpoints 104$i$ may have issued many LGMs. Base station 102 may have initially detected one or more LGMs but may have not subsequently received other LGMs. Given the large number of potentially affected endpoints 104$i$, base station 102 may have been overloaded such that some LGMs were not detected due to collisions associated with PRACH. Furthermore, some affected endpoints 104$i$ may not have successfully sent an LGM before the endpoint 104$i$ was shut down. Endpoints 104$i$ may have sent LGMs in any suitable manner, such as in the manners and embodiments shown and described in conjunction with FIGS. 3-7. Thus, base station 102 may have received some LGMs, but not all LGMs, from endpoints 104$i$ that experienced a mass scale event. Furthermore, as endpoints 104$i$ recover from the mass scale event and attempt to access system 100, base station 102 may be overloaded with requests. In addition, some entities, such as server 108, in communication with endpoints 104$i$ may have need to know which endpoints experienced the mass scale event so as to take remedial measures. Such entities may require fast access to knowledge of which endpoints 104$i$ have experienced the mass scale event. Base station 102, server 108, or a combination of both may be configured to identify endpoints 104$i$ that have experienced the mass scale event to, for example, maximize or optimize the PRACH access of endpoints 104$i$ as they come online, or to provide notification to interested entities such as server 108 about which endpoints 104$i$ are offline. Although the following describes configuration of base station 102, such configuration may be made fully or in part by server 108, though access of endpoints 104$i$ by server 108 may be made through base station 102.

In one embodiment, base station 102 may include modules for zone mapping 801, LGM detection 802, zone identification 804, device identification 806, multiplexer 808, and optimized access 810. Such modules may be implemented in any suitable manner, such as in software, hardware, instructions, functions, applications, shared libraries, code sections, data structures, or any combination thereof.

In another embodiment, zone mapping 801, LGM detection 802, zone identification 804, device identification 806, multiplexer 808, and optimized access 810 may represent elements of a method for performing last gasp device identification. Such a method may be performed by various computer programs, models or any combination thereof, configured to simulate and design systems for last gasp detection. The programs and models may include instructions stored on computer-readable medium, and operable to perform, when executed, one or more of the steps described below. The computer-readable media may include any system, apparatus or device configured to store and retrieve programs or instructions such as a hard disk drive, a compact disc, flash memory or any other suitable device. The programs and models may be configured to direct a processor or other suitable unit to retrieve and execute the instructions from the computer-readable media. For illustrative purposes, zone mapping 801, LGM detection 802, zone identification 804, device identification 806, multiplexer 808, and optimized access 810 may be described with respect to network 100 of FIG. 1; however, these may be used for last gasp identification in any suitable network.

Zone mapping 801 may be configured to enumerate endpoints, such as endpoints 104 in communication with base station 102, and to assign endpoints 104 to a zone in which such endpoints are located. Zone mapping 801 may use an algorithm such as a time advancing (TA) Zone Mapping algorithm. The zone to which an endpoint is assigned may include an ideal zone representation of the coverage area of base station 102. In one embodiment, endpoints 104 may be resident within a defined TA zone. In another embodiment, endpoints 104 may be relatively statically located, providing consistency of information with regards to the TA zone associated with a given endpoint 104. Zone mapping 801 may assign all endpoints 104 connected to base station 102 to specific zones positioned inside the geographical coverage of base station 102. Zone mapping 801 may use any suitable method or mechanism of identifying endpoints 104 as they are connected to system 100 and of identifying the associated TA zone. For example, zone mapping 801 may record the status update of an endpoint 104 as it migrates to an RRC_IDLE status or an RRC_CONNECTED status. Zone mapping 801 may record the status in any suitable manner, such as in a database, file, or other data structure. Furthermore, zone mapping 801 may determine the strength of the endpoint 104 signal or triangulate the endpoint 104 signal to determine the associated TA zone. Zone mapping 801 may be repeated as necessary until a mass event is detected with LGM detection 802.

LGM detection 802 may be configured to determine that one or more LGMs have been received from endpoints 104$i$. In one embodiment, LGM detection 802 may be configured to determine whether a mass event, such as a power failure, has occurred based on received LGMs. LGM detection 802 may provide a flag or other indication that a mass event has occurred. LGM detection 802 may be implemented in any suitable method or mechanism such as by comparing LGMs received or determining that a threshold rate or number of collisions have been detected as illustrated in FIGS. 3-7. In addition, LGM detection 802 may determine how long the mass event has lasted. For example, LGM detection 802 may be configured to determine the duration of a power outage affecting endpoints 104*i*. In one embodiment, LGM detection 802 may be configured to continuously update such a duration. In another embodiment, LGM detection 802 may be configured to report such a duration upon conclusion of the mass event. In yet another embodiment, LGM detection 802 may provide a flag or other indicator that the mass event has concluded. LGM detection 802 may be configured to continuously monitor for arriving LGMs.

LGM detection 802 may be configured to output information in any suitable manner. In one embodiment, LGM detection 802 may be configured to provide notification of a mass event upon conclusion of receiving multiple LGMs. In another embodiment, after LGM detection 802 has detected a mass event and additional LGMs arrive, LGM detection 802 may be configured to notify other modules to reevaluate analysis conducted thus far. LGM detection 802 may be configured to store information regarding endpoints 104*i* in any suitable manner, such as in a file, database, or data structure that may be shared with other modules.

In one embodiment, LGM detection 802 may be configured to perform mass event duration control and monitoring. For example, given a mass event such as a power outage, LGM detection 802 may be configured to determine whether the power outage is ongoing or how long the power outage lasted. LGM detection 802 may be configured to provide such information to, for example, multiplexer 808. Such a determination may be represented by T(LGM).

Zone identification 804 may be configured to estimate which zones, such as TA zones, associated with endpoints 104 are affected by the mass event. In one embodiment, zone identification 804 may be based upon received LGMs from endpoints 104*i*. However, LGMs may be issued by endpoints 104*i* from a given zone but may not be received by base station 102. Thus, in another embodiment zone identification 804 may be initialized by received LGMs and then subsequently applied to the identification of the endpoints located in the entire coverage area for base station 102. If some zones contained no endpoints 104 as identified in zone mapping 801, then zone identification may be skipped for such zones. Upon completion of zone identification 804, an identification of zones by the mass event may be available. Zone identification 804 may be completed in a shorter amount of time than individually polling or sampling every endpoint 104 identified in zone mapping 801 to determine whether such endpoint is connected or whether it has turned off in response to the mass event.

Figure 11:
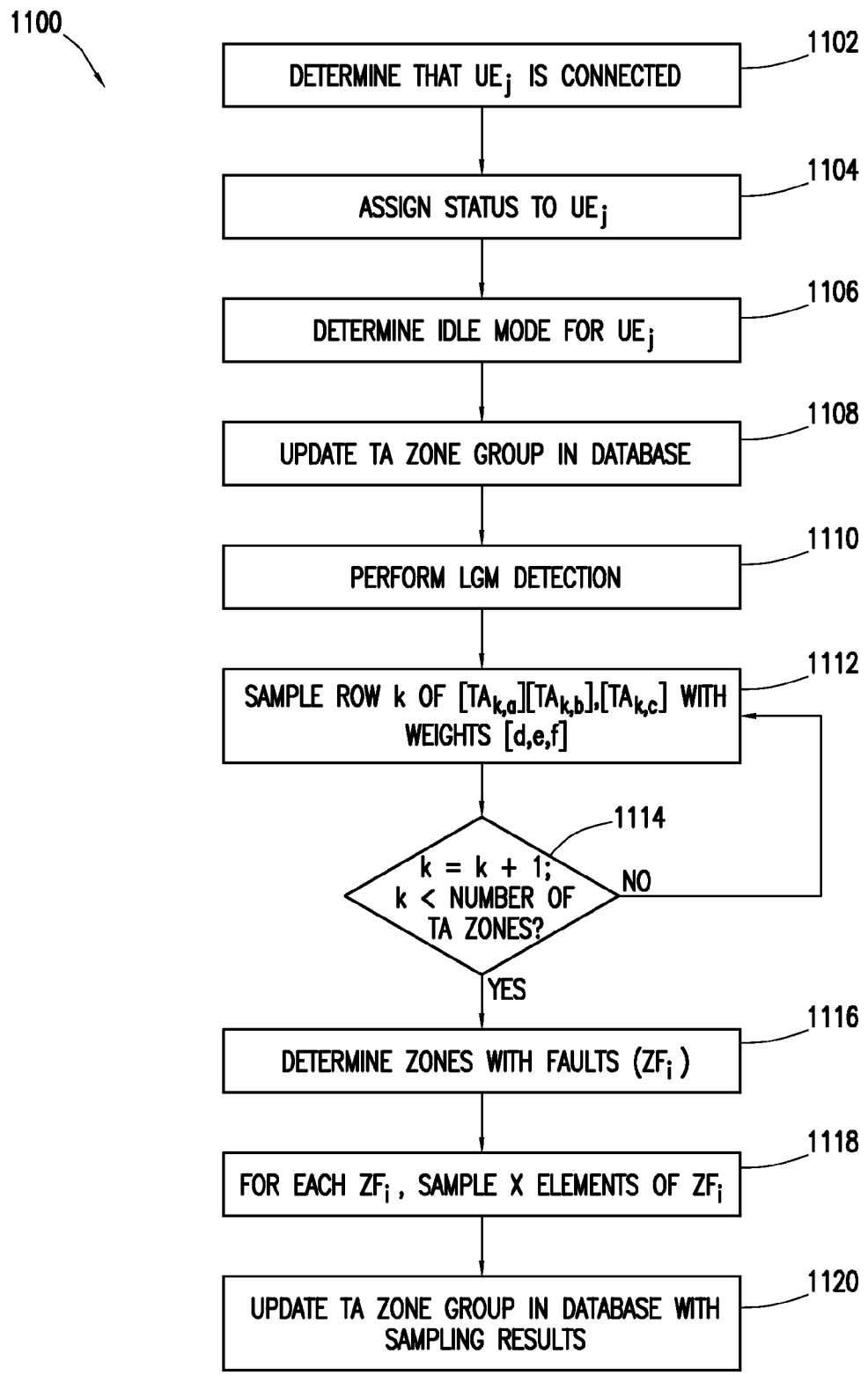
FIG. 11 illustrates a method for performing zone identification, in accordance with some embodiments of the present disclosure.

Zone identification 804 may be configured to perform in any suitable manner, such as in the steps illustrated in and in conjunction with FIG. 11. In one embodiment, zone identification 804 may be configured to sample known endpoints 104 within a given zone. Such sample endpoints may be indicated by, for example, message 606 of FIG. 6. The known endpoints 104 within a given zone from which zone identification 804 may sample may have been determined by zone mapping 801. Such sampling may include polling a given endpoint 104 to determine whether it has turned off when it was expected to be on from zone mapping 801. In a further embodiment, zone identification 804 may sample subsections of a given zone. In yet another further embodiment, zone identification 804 may apply sampling weights to the sampling of zones or zone subsections. The weight may be based on, for example, relative size of the zone or zone subsection, or upon received LGMs from a given zone or subzone.

Zone identification 804 may be configured to output information related to zone sampling in any suitable manner. Zone identification 804 may output a listing of zones or zone subsections associated with base station 102 that include endpoints 104 that are non-responsive. Furthermore, zone identification 804 may output a list of zones or zone subsections from which LGMs were received. Zone identification 804 may be configured to store the results of its analysis in any suitable manner for use by other entities, such as in a database, file, or other data structure.

Device identification 806 may be configured to individually poll or contact endpoints 104 identified in enumeration 802 as connected to system 100. Device identification 806 may be performed in any suitable manner, and at any suitable time. In one embodiment, device identification 806 may be performed upon completion of zone identification 804. In another embodiment, device identification 806 may be performed in parallel with zone identification 804, dependent upon the available resources of base station 102. Device identification 806 may require significantly longer operation than zone identification 804. Device identification 806 may require a longer time to fully page or poll all endpoints 104 than the time of a mass event itself. By polling each endpoint 104, device identification 806 may be more accurate in identifying endpoints 104*i* associated with the mass event than zone identification 804.

Device identification 806 may be configured to time its operation. In one embodiment, device identification 806 may be configured to keep a running total of the time used in execution. In another embodiment, device identification 806 may be configured to estimate the total time necessary to execute the polling of all endpoints 104, based on the number of endpoints 104 known through enumeration. If a mass event, such as a power outage, has terminated before completion of device identification 806, then device identification 806 may be configured to stop operation and output the analysis results to optimized access 810.

Device identification 806 may be configured to output its results in any suitable manner, such as with a database, file, record, or data structure. Device identification 806 may indicate which of endpoints 104 are connected and which of endpoints 104 are non-responsive. In one embodiment, device identification 806 may be configured to output partial results of polling endpoints 104 upon termination of the mass event. In another embodiment, device identification 806 may be configured to only output full results of polling endpoints 104. Device identification 806 may be configured to poll endpoints 104 in an order, priority, or selective basis based upon the results of zone identification 804. For example, device identification 806 may prioritize polling of endpoints in zones identified as experiencing the mass event.

In one embodiment, device identification 806 may be performed wholly or in part by base station 102. In another embodiment, device identification 806 may be performed wholly or in part by server 108.

Multiplexer 808 may be configured to select from results of zone identification 804 and device identification 806 to output to waiting entities, such as optimized access 810 or server 108, which may use the information to take corrective action in response to the mass event. Multiplexer 808 may make such a selection using any suitable criteria. Multiplexer may take into account the time spent or to be spent on each of zone identification 804 and device identification 806, as well as the length of the mass event triggering LGM detection 802. Multiplexer 808 may receive information concerning the status of a mass event (such as a power outage) from a suitable entity, such as LGM detection 802, that a mass event has terminated. Such an indication may be denoted as, for example, T(LGM). Time required or elapsed for operation of device identification 806 may be indicated as, for example, T(LGM_DEVICE_ID). Time required or elapsed for operation of zone identification 804 may be indicated as, for example, T(LGM_ZONE_ID).

In one embodiment, multiplexer 808 may determine whether device identification 806 has completed or will be completed by the time the mass event is complete. If device identification 806 has not completed, then multiplexer 808 may select the output of zone identification 804 to pass to entities such as optimized access 810. If device identification 806 has completed, then multiplexer 808 may select the output of device identification 806 to pass to entities such as optimized access 810. In another embodiment, if the mass event is not over, multiplexer 808 may output interim results from device identification 806 or zone identification 804. In yet another embodiment, if neither device identification 806 nor zone identification 804 has been completed, multiplexer 808 may output a null signal. In an additional embodiment, if the mass event has not terminated, multiplexer 808 may output a null signal.

Figure 9:
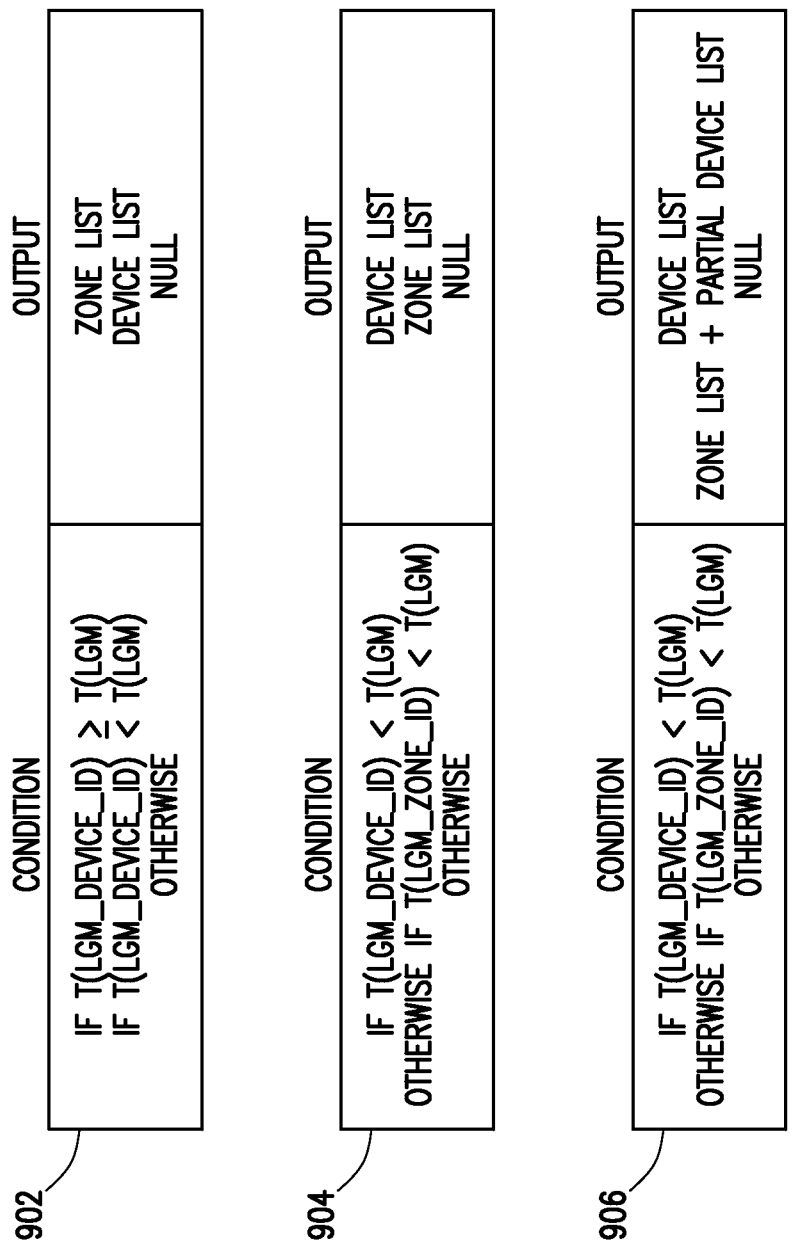
FIG. 9 illustrates various operational conditions of last gasp identification, in accordance with some embodiments of the present disclosure.

FIG. 9 illustrates various operational conditions of last gasp identification, in accordance with some embodiments of the present disclosure. Such operational conditions may be expressed with output tables for use by multiplexer 808 with example predicate conditions, in accordance with some embodiments of the present disclosure.

For example, in table 902, given the condition that the time for completion of device identification 806 is longer than the time of the mass event, multiplexer 808 may output the zone list from zone identification 804. Given the condition that the time for completion of device identification 806 is longer than the time of the mass event, and that the time of the mass event is longer than the time for completion of zone identification, multiplexer 808 may output the set of results (such as a device list) produced by TA device identification algorithm (device identification 806). In any other case, such as wherein the time of the mass event is not known because it has not terminated, or wherein device identification 806 has not completed, multiplexer 808 may output a null signal indicating that results are not yet ready.

In another example, in table 904, given the condition that the time for completion of device identification 806 is shorter than the time of the mass event, multiplexer 808 may output the partial set of results listed in the device list from device identification 806. The output of partial results may be implementation dependent. Such a determination may be made if, for example, device identification 806 has completed but the mass event has not. If such a condition is not met, then given the condition that the time for completion of zone identification 804 is shorter than the time of the mass event, multiplexer 808 may output the zone list from zone identification 804. Such a determination may be made if, for example, zone identification 804 has completed but the mass event has not. In any other case, such as wherein zone identification 804 has not completed, multiplexer 808 may output a null signal indicating that no results are ready. Table 904 may indicate that output may change over time, from null, to a zone list, to a device list, depending upon what is available. The recipient of such information, such as optimized access 810, may require notification from multiplexer 808 that a given output is possibly an interim or final output.

In yet another example, in table 906, given the condition that the time for completion of device identification 806 is shorter than the time of the mass event, multiplexer 808 may output the partial set of results provided by device list from device identification 806. Such a determination may be made if, for example, device identification 806 has completed but the mass event has not. If such a condition is not met, then given the condition that the time for completion of zone identification 804 is shorter than the time of the mass event, multiplexer 808 may output the zone list from zone identification 804 and whatever partial results from device identification 806 are available. Such a determination may be made if, for example, zone identification 804 has completed but the mass event has not. In any other case, such as wherein zone identification 804 has not completed, multiplexer 808 may output a null signal indicating that no results are ready. Table 904 may indicate that output may change over time, from null, to a zone list, to a zone list with a partial device list, and to a device list, depending upon what is available. The recipient of such information, such as optimized access 810, may require notification from multiplexer 808 that a partial or final set of results is available.

Returning to FIG. 8, optimized access 810 may be configured to take any suitable remedial steps. Such steps may include remedial steps to be taken by base station 102 or server 108 to correct problems created by the mass event or to efficiently reconnect endpoints 104i to system 100. Optimized access 810, which may present an orderly PRACH procedure with reduced or no collisions, may be performed wholly or in part by, for example, base station 102 or server 108.

In operation, zone mapping 801 may identify endpoints 104 as they are connected to system 100. Zone mapping 801 may identify a location, such as a TA zone, associated with each endpoint 104 and store the information. Zone mapping 801 may repeat such actions until LGM detection 802 determines that a mass event has occurred. In some embodiments, zone mapping 801 may repeat such actions on a continuous basis. Zone identification 804 may use the determinations of LGM detection 802 to inform a sampling of zones in which endpoints 104 were residing as they were connected to system 100. The sampling may include polling or paging a subset of endpoints 104 recorded as resident within a given zone. Zone identification 804 may determine which zones have unresponsive endpoints 104 and determine that such endpoints are associated with the mass event. Sequentially or in parallel with such operations of zone identification 804, device identification 806 may poll or otherwise contact each endpoint 104 enumerated by zone mapping 801 to determine whether the endpoint is connected to system 100 or not.

Multiplexer 808 may monitor whether the mass event has ended. Based on the time of the mass event, the time to conduct zone identification 804, and the time to conduct device identification 806, multiplexer 808 may selectively choose the output of zone identification 804 or device identification 806 to describe which of endpoints 104 experienced the mass event and may have issued an LGM. Such an LGM may or may not have been received by base station 102. Multiplexer 808 may provide the selected output to an entity that may take remedial action, such as optimized access 810 or server 108.

Figure 10:
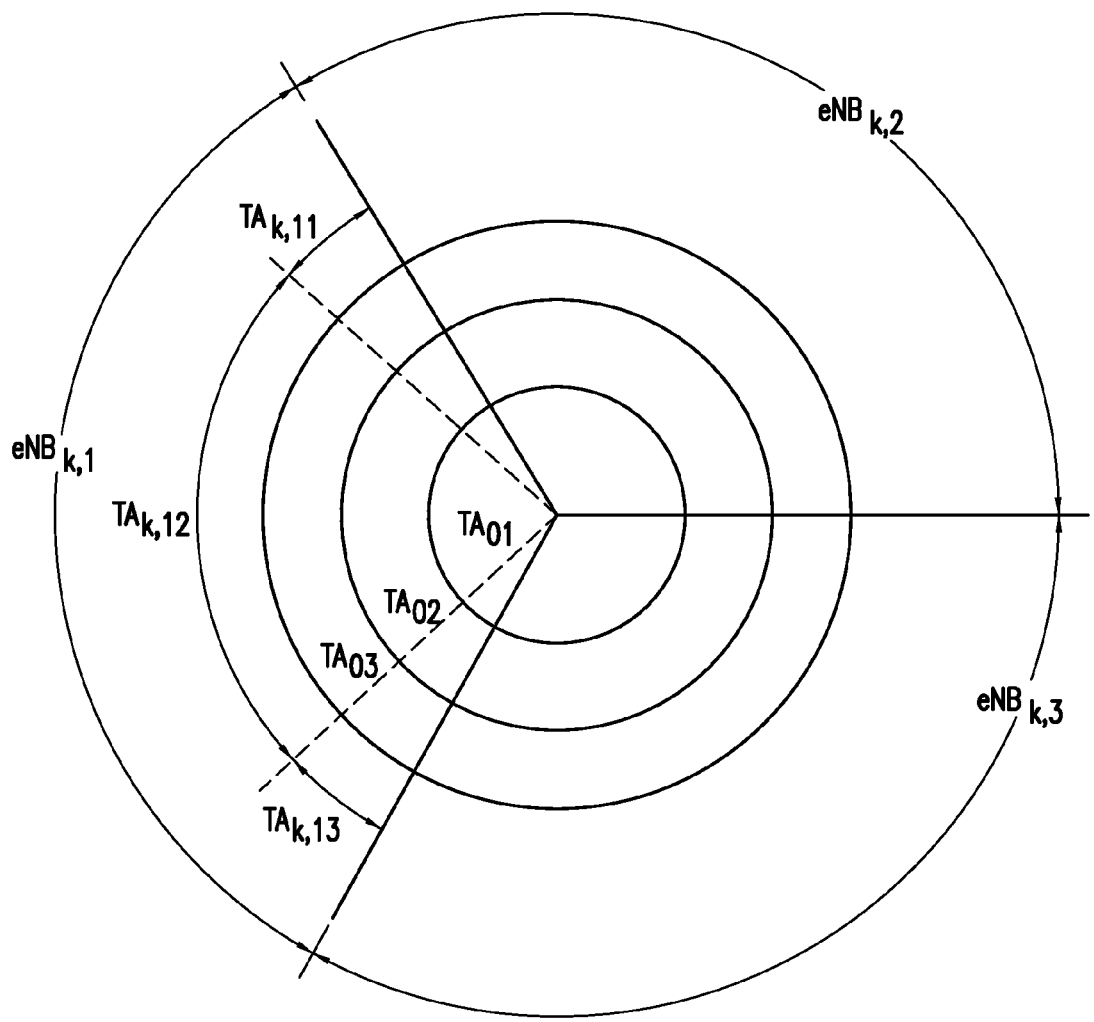
FIG. 10 is an illustration of an ideal time advancing zone mapping associated with a base station, in accordance with one embodiment of the present disclosure.

FIG. 10 is an illustration of an ideal TA zone mapping associated with, for example, base station 102, in accordance with one embodiment of the present disclosure. The 360° coverage area for co-located base stations 102 may be divided into three sectors related to three base stations, each covering 120° and denoted by $eNB_1$, $eNB_2$, and $eNB_3$. Furthermore, the coverage area of base station 102 may be divided into TA zones that reach progressively further from the center of the zone map. The zones may include, for example, $TA_{O1}$, $TA_{O2}$, and $TA_{O3}$, which may be referred to as rows. Zone identification 804 may utilize the intersection of the sector and TA zone divisions to identify specific portions of the coverage map in which an endpoint 104 may reside. Furthermore, the range of TAs within a given circular sector may be divided into circular subsectors, such that a location may be specified by being adjacent sector ($eNB_1$, $eNB_2$, and $eNB_3$), row ($TA_{O1}$, $TA_{O2}$, and $TA_{O3}$), and subsector within the row (a, b, c). In the example of FIG. 10, sector $eNB_1$, with rows $TA_{O1}$, $TA_{O2}$, and $TA_{O3}$, may include subsectors 11, 12, and 13 (addressable by $TA_{k,1,11}$; $TA_{k,1,12}$; and $TA_{k,1,13}$) for each such row. The subsectors may be of variable angle width. Although FIG. 10 illustrates an example of a TA zone map for addressing the location or zone of endpoints 104, any suitable mapping may be used.

FIG. 11 illustrates a method 1100 for performing zone identification, in accordance with some embodiments of the present disclosure. Method 1100 may implement fully or in part zone identification 804 of FIG. 8. The steps of method 1100 may be performed by various computer programs, models or any combination thereof, configured to simulate and design systems for last gasp detection. The programs and models may include instructions stored on computer-readable medium, and operable to perform, when executed, one or more of the steps described below. The computer-readable media may include any system, apparatus or device configured to store and retrieve programs or instructions such as a hard disk drive, a compact disc, flash memory or any other suitable device. The programs and models may be configured to direct a processor or other suitable unit to retrieve and execute the instructions from the computer-readable media. For illustrative purposes, method 1100 is described with respect to network 100 of FIG. 1; however, method 1100 may be used for last gasp identification on any suitable network.

Method 1100 may be performed in association with a base station, such as base station 102 of FIG. 7. Method 110 may be repeated or performed in parallel for each one of the co-located base stations, using a sectorization as illustrated in FIG. 10. Each such sector may correspond to a given base station.

At 1102, endpoints (each designated as $UE_j$) may be activated and connected to a wireless system such as system 100. At 1104, the status for each endpoint may be assigned as connected, and at 1106 the status of each such endpoint may be assigned as idle. At 1108, it may be determined that the endpoint has successfully connected to the system and an entry for TA zone tracking may be created for the endpoint, along with a determination of the TA zone in which the endpoint resides. For a given zone, the endpoints determined to be connected may be grouped into a TA zone group. The TA zones may be created, in one embodiment, based on the TA information processed by base station 102 for each one of the connected endpoints A real-time record of the endpoints may be stored into a database, file, or other suitable entity. In one embodiment, the endpoint may include a mobile device that moves from one zone to another. In such a case, 1108 may be repeated as necessary to update the location of the endpoint. In another embodiment, the endpoint may include a fixed point as part of an M2M network, and thus may not require such repetition of 1108. 1102, 1104, 1106, and 1108 may be implemented fully or in part by zone mapping 801 of FIG. 8.

In 1110, a mass event may be detected. The mass event may be detected, for example, as a result of increased collisions in a group, as shown in FIGS. 3-6. Such a mass event may include reception of LGMs. 1110 may be implemented fully or in part by LGM detection 802 of FIG. 8. 1110 may be repeated as additional LGMs are received, causing a repeat of subsequent actions of method 1100.

In 1112, the circular subsections—such as a, b, and c—of a row k of TA zones may be sampled. Such sampling may include polling a subset of the endpoints recorded as resident within the subsection to determine whether a given endpoint is not connected. The sampling may be assigned weights, such as d, e, and f, for each subsection. The weights, which may be determined empirically, may be used to increase or decrease sampling based on, for example, radial or angular size of the subsection, or previously received LGM rate from various subsections. Any disconnected endpoints from the samples may be recorded as associated with the sector, TA, and subsection.

In 1114, the row k may be incremented. If the row number k is still within the number of maximum TA zones m, then 1112 may be repeated for the new row. Otherwise, method 1110 may proceed to 1116.

In 1116, sectors, TA zones, or subsections associated with disconnected endpoints, and thus possibly the mass event, may be reported as ZFi. Such sectors, TA zones, or subsections may be used to conduct remedial action, if such information is reported by, for example, multiplexer 808 of FIG. 8.

In 1118, additional sampling may be performed upon ZFi to provide additional information regarding the mass event. For each ZFi, x samples may be taken. Such samples may resemble the operation of 1112, wherein x number of endpoints known to have resided with the sector, TA zone, or subsection may be polled to determine whether the endpoints are connected or not. The results may be used to construct a TA zone list in 1120, indicating sectors, TA zones, or subsections possibly affected by the mass event and, further, to what degree such a sector, TA zone, or subsection is affected. The zone list may be a modified version of the TA zone group determined in 1108. The zone list may be stored in a database, file, or other suitable entity.

In order to increase the accuracy of the TA Zone ID algorithm, method 1100 may be repeated until a desired LGM device identification per zone has been achieved.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions has been described in detail, it should be understood that the various changes, substitutions, and alterations could be made hereto without departing from the spirit and scope of the invention.

What is claimed is:

1. A method for device identification comprising:
   determining a mass event has occurred in a wireless network from a reception of a plurality of signals each having a last gasp message (LGM);
   sampling a plurality of mapped zones associated with a base station, each mapped zone including a plurality of wireless device endpoints associated with the mapped zone, the sampling including determining whether any of a subset of the endpoints associated with the given mapped zone are disconnected from the wireless network;
   identifying which mapped zones are associated with a disconnected endpoint in a zone list;

determining a length of time of the mass event; and selectively providing the zone list to identify disconnected endpoints based at least upon the length of time of the mass event;

wherein the mapped zones include time advancing zones.

2. The method of claim 1, further comprising:

initializing a polling of each wireless device endpoint previously determined to have been connected to the wireless network, the polling including determining whether each wireless device is presently connected to the wireless network;

determining a length of time of the polling of each wireless device; and selectively providing the results of the polling of each wireless device to identify disconnected endpoints based on at least upon a comparison of the length of time of the mass event and the length of time of the polling of each wireless device.

3. The method of claim 2, wherein selectively providing the results of polling of each wireless device and the zone list to identify disconnected endpoints includes providing either the results of polling each wireless device or the zone list based upon the comparison of the length of time of the mass event and the length of time of the polling of each wireless device.

4. The method of claim 1, wherein determining a mass event has occurred includes determining an amount of physical random access channel (PRACH) message collisions.

5. The method of claim 1, wherein the mapped zones are sampled with an associated weight.

6. The method of claim 1, wherein at least one of the sampled mapped zones is unassociated with any received last gasp messages.

7. One or more non-transitory computer-readable media embodying logic that, when executed by a processor, is configured to perform operations comprising:

determining a mass event has occurred in a wireless network from a reception of a plurality of signals each having a last gasp message (LGM);

sampling a plurality of mapped zones associated with a base station, each mapped zone including a plurality of wireless device endpoints associated with the mapped zone, the sampling including determining whether any of a subset of the endpoints associated with the given mapped zone are disconnected from the wireless network;

identifying which mapped zones are associated with a disconnected endpoint in a zone list;

determining a length of time of the mass event; and selecting the zone list to identify disconnected endpoints based at least upon the length of time of the mass event;

wherein the mapped zones include time advancing zones.

8. The non-transitory media of claim 7, wherein the logic is further configured to cause the processor to perform operations comprising:

initializing a polling of each wireless device endpoint previously determined to have been connected to the wireless network, the polling including determining whether each wireless device is presently connected to the wireless network;

determining a length of time of the polling of each wireless device; and selecting the results of the polling of each wireless device to identify disconnected endpoints based on at least upon a comparison of the length of time of the mass event and the length of time of the polling of each wireless device.

9. The non-transitory media of claim 8, wherein selectively providing the results of polling of each wireless device and the zone list to identify disconnected endpoints includes providing either the results of polling each wireless device or the zone list based upon the comparison of the length of time of the mass event and the length of time of the polling of each wireless device.

10. The non-transitory media of claim 7, wherein determining a mass event has occurred includes determining an amount of physical random access channel (PRACH) message collisions.

11. The non-transitory media of claim 7, wherein the mapped zones are sampled with an associated weight.

12. The non-transitory media of claim 7, wherein at least one of the sampled mapped zones is unassociated with any received last gasp messages.

13. A base station for wireless communication comprising:

a memory;

a processor coupled to a memory, the processor configured to:

determine a mass event has occurred in a wireless network from a reception of a plurality of signals each having a last gasp message (LGM);

sample a plurality of mapped zones associated with a base station, each mapped zone including a plurality of wireless device endpoints associated with the mapped zone, the sampling including determining whether any of a subset of the endpoints associated with the given mapped zone are disconnected from the wireless network;

identify which mapped zones are associated with a disconnected endpoint in a zone list;

determine a length of time of the mass event; and select the zone list to identify disconnected endpoints based at least upon the length of time of the mass event;

wherein the mapped zones include time advancing zones.

14. The base station of claim 13, wherein the processor is further configured to:

initialize a polling of each wireless device endpoint previously determined to have been connected to the wireless network, the polling including determining whether each wireless device is presently connected to the wireless network;

determine a length of time of the polling of each wireless device; and select the results of the polling of each wireless device to identify disconnected endpoints based on at least upon a comparison of the length of time of the mass event and the length of time of the polling of each wireless device.

15. The base station of claim 14, wherein selectively providing the results of polling of each wireless device and the zone list to identify disconnected endpoints includes providing either the results of polling each wireless device or the zone list based upon the comparison of the length of time of the mass event and the length of time of the polling of each wireless device.

16. The base station of claim 13, wherein determining a mass event has occurred includes determining an amount of physical random access channel (PRACH) message collisions.

17. The base station of claim 13, wherein at least one of the sampled mapped zones is unassociated with any received last gasp messages.

18. The base station of claim 13, wherein the mapped zones are sampled with an associated weight.

\* \* \* \* \*